(12) United States Patent
Jaeh et al.

(10) Patent No.: US 12,462,702 B2
(45) Date of Patent: Nov. 4, 2025

(54) SYSTEM FOR ONLINE AUTOMATED EXAM PROCTORING

(71) Applicant: PROCTORU, INC., Livermore, CA (US)

(72) Inventors: Matthew Jaeh, Pelham, AL (US); Jarrod Morgan, Hoover, AL (US); Andrew Millin, Kalamazoo, MI (US)

(73) Assignee: PROCTORU, INC., Livermore, CA (US)

( * ) Notice: Subject to any disclaimer, the term of this patent is extended or adjusted under 35 U.S.C. 154(b) by 0 days.

(21) Appl. No.: 18/735,106

(22) Filed: Jun. 5, 2024

(65) Prior Publication Data

US 2024/0386806 A1 Nov. 21, 2024

Related U.S. Application Data

(60) Continuation of application No. 17/683,970, filed on Mar. 1, 2022, now Pat. No. 12,039,887, which is a division of application No. 17/342,364, filed on Jun. 8, 2021, now Pat. No. 11,295,626, which is a continuation of application No. 16/258,140, filed on Jan. 25, 2019, now Pat. No. 11,205,349, which is a division of application No. 15/891,734, filed on Feb.
(Continued)

(51) Int. Cl.
| G09B 5/00 | (2006.01) |
| G09B 7/00 | (2006.01) |
| G06Q 10/10 | (2023.01) |
| G06Q 10/109 | (2023.01) |
| G06Q 10/1093 | (2023.01) |
| G09B 3/00 | (2006.01) |
| G09B 7/02 | (2006.01) |
| G09B 7/06 | (2006.01) |

(52) U.S. Cl.
CPC .................. *G09B 5/00* (2013.01); *G09B 7/00* (2013.01); *G06Q 10/10* (2013.01); *G06Q 10/109* (2013.01); *G06Q 10/1095* (2013.01); *G09B 3/00* (2013.01); *G09B 7/02* (2013.01); *G09B 7/06* (2013.01)

(58) Field of Classification Search
None
See application file for complete search history.

(56) References Cited

U.S. PATENT DOCUMENTS 12,039,887 B2 * 7/2024 Jaeh .......................... G09B 7/00

* cited by examiner

*Primary Examiner* — James B Hull
(74) *Attorney, Agent, or Firm* — SQUIRE PATTON BOGGS (US) LLP

(57) ABSTRACT

Certain embodiments may be directed to a system and method for proctoring an exam, and more particularly, for online automated exam proctoring. A method may include checking a test-taker's computing device for compatibility, and for content that provide unauthorized aid to the test-taker during a testing session. The method may also include taking a photo of the test-taker, recording the test-taker by performing a room pan while analyzing the surrounds of the test-taker for unauthorized objects, and validating the identity of the test-taker by way of at least one of presenting challenge questions, obtaining voice biometrics, or obtaining keystroke biometrics. The method may further include recording the test-taker's audio or video and desktop feed, determining if the test-taker is exhibiting questionable behavior, and suspending the testing session if it is determined that the test-taker is exhibiting questionable behavior.

5 Claims, 35 Drawing Sheets

Related U.S. Application Data

8, 2018, now abandoned, which is a continuation-in-part of application No. 15/462,676, filed on Mar. 17, 2017, now Pat. No. 10,083,619, which is a continuation of application No. 14/067,796, filed on Oct. 30, 2013, now Pat. No. 9,601,024, which is a continuation of application No. 13/007,341, filed on Jan. 14, 2011, now abandoned.

(60) Provisional application No. 61/295,508, filed on Jan. 15, 2010.

The ProctorU Scheduling Portal login page
FIG. 2

Scheduling Portal

Exam reservation interface

FIG. 5

Scheduling Portal showing the countdown clock that indicates when a student's assessment will begin.

Scheduling Portal showing the button that allows students to begin their proctoring session.

Flow of communication and connectivity between proctor and student.

FIG. 8

The 3 Steps to Take Your Exam

Step 1: Connect Your Cam. You should see yourself below, and a call should automatically initiate. If you have trouble or youre call doesn't begin within 30 seconds, skip to step two so your proctor can help you.

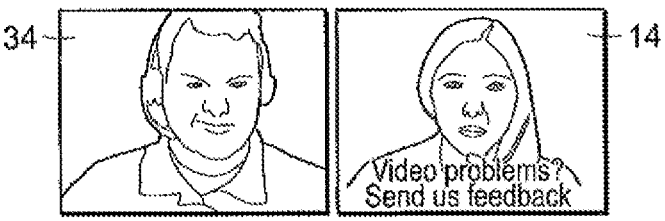

Step 2: Connect Your Screen. Fill out your name, school, and contact number, and click "connect your screen". A download will start, that you will need to "run" or "open". If you have problems connecting, please call 205-870-8122.

Please enter your name: ▭
Please enter your school: ▭ ← 800
Please enter a contact phone number: ▭

[Connect Your Screen]

Step 3: Authenticate. Once your proctor is watching, authenticate yourself.

[Authenticate]

1. Make sure your web cam is plugged in and your speakers are plugged in and turned on.

2. Be sure that no other program is running other than this browser window.

3. Your call should begin immediately. If you lose connection or do not reach someone, press the "refresh" button on your browser. If a window pops up with a question, hit "allow". You will be connected to your proctor via the window above.

4. After verifying you are ready to take your exam, you proctor will help you start your exam.

5. You are not allowed to leave sight of the web cam during your exam. If situations arise, please notify your proctor.

IF TECHNICAL ISSUES ARISE, PLEASE CONTACT 205-070-8122

Session I.D:
ind9adcpnvvz6jpx
Session ID is for proctor use only

FIG. 9

Activity Report ProctorU Online Exam Proctoring Friday January 8, 2010
All Users
12/12/2009 to 12/12/2009 [Close]

| Student | Start | End | Test | School | Proctor | Comment |
|---|---|---|---|---|---|---|
| adam smith | 12/12 6:30am | 8:00 AM | FINITE MATHEMATICS | Andrew Jackson University | Rebecca Black | Proctor Notes Student's connectivity wasn't good enough to continue webcam. Student has another exam, and proctors will work to try to remedy problem if possible at that time. Session ID: 509812o0q0ya9qgz |
| Andrea Jones | 12/12 7:15am | 8:15 AM | BA340-Midterm | Andrew Jackson University | Rebecca Black | uux5cr31fta728bj |
| adam smith | 12/12 10:30am | 12:30 PM | BUSINESS ETHICS | Andrew Jackson University | Stephani Gwen | Exam proctored successfully |
| Tamara Nevercomes | 12/12 12:15pm | 2:15 PM | CM346 Final | Andrew Jackson University | Stephani Gwen | Exam proctored successfully |

The proctored exams report.

FIG. 10 http://pc.kal-soft.com/AdminEditConfig.asp

Online Proctoring Center

Proctor Line: (205) 870-8122

Schedule
Users
Test Station
General
User Types
Test Types
Schools
Exam Lists
Time Zones
Cancel Codes
History
Activity Report
Cancel Report
E-Mail
Export

General Settings

| Company | Schedule | Reservations | Interface | Terms | Maintenance | Events | Contact |

1000

Term End Date (mm/dd/yyyy): [12/31/2008]

Require a Reason for Cancelled Reservations: ●Yes ○No

Throttle Exams Concurrent Start: [1 ▼]

Throttle Exams Concurrent Running: [5 ▼]

Must enter password to dispatch?: ●Yes ○No

Automatically print dispatch sheet?: ●Yes ○No

[Update]

1002

The exam capacity throttle

The administrator's view of 10 available Virtual Exam Rooms.

Online Proctoring Center http://pc.kai-soft.com/ActivityReport.asp?location=1&date=1/12/2010

Proctor Line: (205) 870-8122

Activity Report

| School: | All Schools ▼ |
| Student: | All Students ▼ |
| Start Date: | 12/12/2009 |
| End Date: | 1/12/2010 |
| Display Pictures: | ○Yes ●No |

[Create Report]

Online Proctoring Center http://pc.kal-soft.com/EditReservation.asp/reservation=/48/&date=1/12/2010

Proctor Line: (205) 870-8122

Edit Reservation

School: All
Student: Adam Smith
Proctor: Black Rebecca
Station: Room 02
Name of Test: Admin Law & Business Organizations
Start Date/Time: 1/12/2010  6:15 PM
End Time: 8:15 PM
Comments:

[info]

[Update] [Delete] [Back]

← 1500

Proctor "Edit Menu"

FIG. 15

The Edit/Add User Menu

FIG. 18

Online Proctoring Center
Proctor Line: (205) 870-8122

| Schools | |
|---|---|
| School: | (New School) |
| School Name: | |
| Sort Order: | 0 |
| Color: | ☐ [Pick Color] |
| Use Term Dates: | ○Yes ●No |
| Start Date: | 1/12/2010 |
| End Date: | 1/12/2010 |
| User Exam List: | ○Yes ●No |
| Active: | ○Yes ●No |

1900 eMail Message Text

Subject: [          ]    Tokens
Message:

<name>
<date>
<time>
<exam>
<url>
<computer>
<userid>
<password>

[Add]

Schools Admin Console

FIG. 19

Exam List Settings

Cancellation Report in the Admin Console

FIG. 21

SYSTEM FOR ONLINE AUTOMATED EXAM PROCTORING

CROSS-REFERENCE TO RELATED APPLICATION

This application is a Continuation of U.S. Non-Provisional patent application Ser. No. 17/683,970, filed Mar. 1, 2022, which is a Divisional application of Ser. No. 17/342,364, filed Jun. 8, 2021, which is a Continuation of U.S. Non-Provisional patent application Ser. No. 16/258,140, filed Jan. 25, 2019, now U.S. Pat. No. 11,205,349, which is a Divisional Patent Application of U.S. Non-Provisional application Ser. No. 15/891,734, filed Feb. 8, 2018, which is a Continuation-in-Part of U.S. Non-Provisional patent application Ser. No. 15/462,676, filed on Mar. 17, 2017, now U.S. Pat. No. 10,083,619, which is a continuation of U.S. Non-Provisional patent application Ser. No. 14/067,796, filed on Oct. 30, 2013, now U.S. Pat. No. 9,601,024, which is a continuation of U.S. Non-Provisional application Ser. No. 13/007,341, filed on Jan. 14, 2011, now abandoned, which claims the benefit of U.S. Provisional Patent Application No. 61/295,508 filed on Jan. 15, 2010. The entire contents of all of these earlier filed applications are hereby incorporated by reference in their entirety.

FIELD OF THE INVENTION

Certain embodiments of the invention is directed to a system and method for proctoring an exam, and more particularly, for online automated exam proctoring.

BACKGROUND OF THE INVENTION

Since the invention of the classroom, there have been exams to determine how well a student has learned the subject matter. With the advent of large classes, and written exams, the monitoring (proctoring) of exams has been a necessity. As well known in the art, teachers, and then later professional proctors, remain in the classroom to observe the exam taking procedure to prevent false results through cheating. This in person proctoring of exams has been satisfactory for use in conventional education environments. However, the advent of distance learning by educational institutions such as Andrew Jackson University, the University of Phoenix and others have made it impracticable to personally monitor each student taking an exam because without the commonality of the physical classroom, the students are too widely disbursed.

Many institutions and companies faced with this problem have attempted to circumvent it by diluting the course requirements and eliminating the requirement of a proctored exam in lieu of written papers or projects. Those institutions who had tried to solve the problem approached the situation with a high level of automation and the lowest level of human interaction possible making the system rife for fraud.

Further, since the invention of remote online proctoring, there have been inherent challenges that needed to be overcome in order to achieve success in replicating and replacing the traditional face-to-face proctoring method. One such challenge found in both traditional face-to-face proctoring and online proctoring is human error. Regardless of the selection process, training, auditing, and oversight that might be applied to a proctor, humans will inevitably continue to error.

Another challenge has been inefficiency. For instance, a highly trained proctor is only able to accurately watch a maxim of six to eight simultaneous online exam sessions using current industry accepted online proctoring methods. A further challenge is scalability. For example, if an organization were to proctor only two of the major college bound entrance exams, approximately 4 million exams in a year (uniformly distributed across 365 days and the exams were 2 hours long), that organization would need to employ approximately 642 proctors to overcome that volume. That requirement is for two exams with perfect exam distribution across a year. In reality, there are hundreds of thousands of different exams with hundreds of million exams proctored annually.

Customer service has also been a challenge. Since people tend to be averse to waiting, one of the major contributors to customer satisfaction in online proctoring the wait time. Wait time includes the time it takes to connect to a remote proctor, authenticate the test-taker, secure their computing environment, and get them into their exam. Further, bandwidth availability and stability have become major issues in online proctoring.

Accordingly, a system and method for overcoming the shortcomings of the prior art by enabling a live proctor to monitor a student's exam process, including student identification, as well as the immediate exam environment is desired. It is also desired to consider user experience, cheater adaptability, and hybrid scalability.

SUMMARY OF THE INVENTION

According to certain embodiments, an apparatus may include at least one processor, and at least one memory including computer program code. The at least one memory and the computer program code may be configured to, with the at least one processor, cause the apparatus at least to check a test-taker's computing device for compatibility, and for content that provide unauthorized aid to the test-taker during a testing session. The at least one memory and the computer program code may also be configured to, with the at least one processor, cause the apparatus at least to take a photo of the test-taker. In addition, the at least one memory and the computer program code may be configured to, with the at least one processor, cause the apparatus at least to record the test-taker by performing a room pan while analyzing the surrounding of the test-taker for unauthorized objects. The at least one memory and the computer program code may further be configured to, with the at least one processor, cause the apparatus at least to validate the identity of the test-taker by way of at least one of presenting challenge questions, obtaining voice biometrics, or obtaining keystroke biometrics. The at least one memory and the computer program code may also be configured to, with the at least one processor, cause the apparatus at least to record the test-taker's audio or video and desktop feed. Further, the at least one memory and the computer program code may be configured to, with the at least one processor, cause the apparatus at least to determine if the test-taker is exhibiting questionable behavior based on an analysis of the compatibility of the test-taker's computing device, the test-taker's photo, the room pan, validation of the test-taker's identity, and recordation of the test-taker's audio or video and desktop feed. In addition, the at least one memory and the computer program code may be configured to, with the at least one processor, cause the apparatus at least to suspend the testing session if it is determined that the test-taker is exhibiting questionable behavior.

The at least one memory and the computer program code may also be configured to, with the at least one processor, cause the apparatus at least to provide the test-taker with test rules defined by an institution of the test-taker, and check the test-taker's computing device for applications, code, or materials used to provide unauthorized aid during the testing session. In addition, the at least one memory and the computer program code may be configured to, with the at least one processor, cause the apparatus at least to send the test-taker a warning signal when it is determined that the test-taker is exhibiting questionable behavior, and communicate with a live proctor when it is determined that the test-taker is exhibiting questionable behavior. Further, the at least one memory and the computer program code may be configured to, with the at least one processor, cause the apparatus at least to adjust system settings for proctored test sessions, review completed proctoring test sessions, and view sessions flagged for questionable behavior of the test-taker.

According to certain other embodiments, a method may include checking a test-taker's computing device for compatibility, and for content that provide unauthorized aid to the test-taker during a testing session. The method may also include taking a photo of the test-taker, recording the test-taker by performing a room pan while analyzing the surrounding of the test-taker for unauthorized objects, and validating the identity of the test-taker by way of at least one of presenting challenge questions, obtaining voice biometrics, or obtaining keystroke biometrics. The method may further include recording the test-taker's audio or video and desktop feed, and determining if the test-taker is exhibiting questionable behavior based on an analysis of the compatibility of the test-taker's computing device, the test-taker's photo, the room pan, validation of the test-taker's identity, and recordation of the test-taker's audio or video and desktop feed. Further, the method may include suspending the testing session if it is determined that the test-taker is exhibiting questionable behavior.

The method may further include providing the test-taker with test rules defined by an institution of the test-taker, checking the test-taker's computing device for applications, code, or materials used to provide unauthorized aid during the testing session, sending the test-taker a warning signal when it is determined that the test-taker is exhibiting questionable behavior, and communicating with a live proctor when it is determined that the test-taker is exhibiting questionable behavior. In addition, the method may include adjusting system settings for proctored test sessions, reviewing completed proctoring test sessions, and viewing sessions flagged for questionable behavior of the test-taker.

According to certain other embodiments, a computer program may be embodied on a non-transitory computer readable medium. The computer program, when executed by a processor, may cause the processor to check a test-taker's computing device for compatibility, and for content that provide unauthorized aid to the test-taker during a testing session. The computer program, when executed by the processor, may also cause the processor to take a photo of the test-taker, record the test-taker by performing a room pan while analyzing the surrounding of the test-taker for unauthorized objects, and validate the identity of the test-taker by way of at least one of presenting challenge questions, obtaining voice biometrics, or obtaining keystroke biometrics. The computer program, when executed by the processor, may further cause the processor to record the test-taker's audio or video and desktop feed, and determine if the test-taker is exhibiting questionable behavior based on an analysis of the compatibility of the test-taker's computing device, the test-taker's photo, the room pan, validation of the test-taker's identity, and recordation of the test-taker's audio or video and desktop feed. In addition, the computer program, when executed by the processor, may cause the processor to suspend the testing session if it is determined that the test-taker is exhibiting questionable behavior.

Further, the computer program, when executed by the processor, may cause the processor to provide the test-taker with test rules defined by an institution of the test-taker, to check the test-taker's computing device for applications, code, or materials used to provide unauthorized aid during the testing session, send the test-taker a warning signal when it is determined that the test-taker is exhibiting questionable behavior, and communicate with a live proctor when it is determined that the test-taker is exhibiting questionable behavior. In addition, the computer program, when executed by the processor, may cause the processor to adjust system settings for proctored test sessions, review completed proctoring test sessions, and view sessions flagged for questionable behavior of the test-taker.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2 is an example of a log in portal for use by the exam taking student in accordance with the invention.

FIG. 5 is a scheduling portal with countdown clock in accordance with the invention.

FIG. 8 is an exemplary screen shot of the interaction between a proctor and a student in accordance with the invention.

FIG. 9 is a screen shot of a collection of proctor reports in accordance with the invention.

FIG. 10 is a screen shot for setting the parameters of the exam throttle in accordance with the invention.

FIG. 13 is a screen shot of an interactive page for a school report in accordance with the invention.

FIG. 15 is an exemplary screen shot of an edit menu to be utilized by a proctor in accordance with the invention.

FIG. 18 is an exemplary screen shot enabling an administrator or proctor to edit or add users to the system in accordance with the invention.

FIG. 19 is an exemplary screen shot of an administration console to be utilized by the institution providing the exam to be proctored in accordance with the invention.

FIG. 21 is an exemplary screen shot of a cancellation report in accordance with the invention.

DETAILED DESCRIPTION OF THE INVENTION

Figure 1:
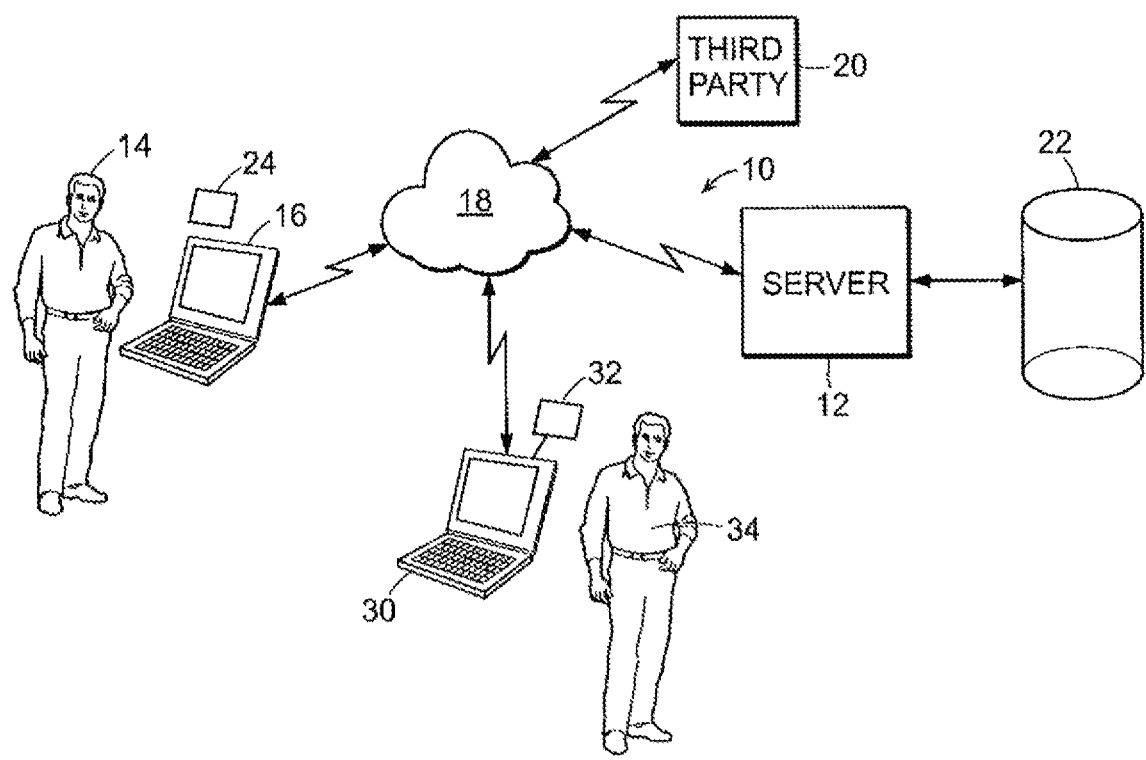
FIG. 1 is a schematic view of a system for providing remote proctoring in accordance with the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Any combination of one or more computer usable or computer readable medium(s) may be utilized in, with, or in conjunction with components and/or certain embodiments of the invention described herein. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk drive (HDD), a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. A computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out methods of certain embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart(s) and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart(s) and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart(s) and/or block diagram block or blocks.

Certain embodiments described herein may work with a large majority of users without the need for different hardware, complex software installations, and drastic modifications of testing behavior or environment. Further, accuracy of certain embodiments described herein may be improved by implementing machine learning to account for cheater adaptability. Other embodiments may be designed to operate alone, or work with human counterparts to augment their ability to perform various proctoring functions.

Certain embodiments may include a system that integrates with online test delivery or online learning management systems to automatically proctor test-takers during their exams. The test-taker interface of the system may rely on the use of the test-taker's camera, microphone, keyboard, and mouse to collect behavioral input during the exam session. Based on the test-taker's collected behavioral input, the system may flag or end the exam session and subsequently notify the exam provider in the event of aberrant behavior. According to other embodiments, the system may perform this analysis and determination of aberrant behavior through the use of supervised machine learning software implemented on a computing device.

According to certain embodiments, the test-taker's behavioral input may be collected automatically by the test-taker's computer and sent back to the media server for analysis. In certain embodiments, the collected input may be controlled by a programmed server, such as, for example a media server described herein, which may have the ability to process behavioral input. The media server may receive and evaluate this input many times a second. In addition, according to other embodiments, a processing server may also receive and evaluate this input many times a second as with the media server.

In certain embodiments, the behavioral input may include, but not limited to, facial characteristics, movement of the test-taker, sounds in the test-taker's environment, lighting of the test-taker's environment, and the test-taker's computer input from a keyboard and/or mouse clicks. According to certain embodiments, the inputs may be evaluated separately and in any combination. For example, in certain embodiments, it is possible to detect if someone, such as the test-taker, is using external resources by looking for a loss of face or a profile view of the face of the test-taker for approximately 10 or more seconds, and then followed by mouse and/or keyboard input(s) by the test-taker, and then a subsequent answer submission by the test-taker. In other embodiments, the evaluation time may be varied, and may be, for example, less than 10 seconds.

According to certain embodiments, biometrics of the test-taker may be stablished prior to the test, and then continuously monitored during the exam. The biometrics obtained from the test-taker may include, but not limited to, voice, keystroke, and identity information. Inputs of the biometric information may be collected throughout an exam session many times a second. The biometric information may be automatically collected via components of the test-taker's computer, such as, for example, from a camera, keyboard, mouse, and/or microphone. However, in other embodiments, the biometric information may be selectively collected, the selection being controlled and/or determined by a proctor or administrator.

According to certain embodiments, there may be provided a system that integrates with online test delivery or online learning management systems to automatically proctor test-takers during their exams. In certain embodiments, the system may monitor the test-taker in real-time by collecting behavioral input from their camera, microphone, keyboard, and mouse. During the exam, a proctor or exam facilitator may observe the session in real-time and interact with the test-taker using voice and chat. In the event the system detects aberrant behavior, the proctor or system may flag the session for further review, and send a warning signal to the test-taker.

In certain embodiments, there may be at least four different user types. These user types may include test-takers, exam administrators/instructors, proctors/reviewers, and system administrators. According to certain embodiments, test-takers, using a computing device with an Internet connection, camera, microphone and a supported operating system, may use the system to observe themselves, alongside their test-delivery or learning management system (LMS) while they take an exam. Prior to starting the exam, the system according to certain embodiments may require the test-taker to submit a self-photo, show a photo ID, show their work area, and confirm exam rules. In addition, the system may require the test-taker to submit a biometric sample and/or answer challenge questions. After the exam has started, the system may alert the test-taker if they are performing actions that the system deems outside the threshold for normal.

According to certain embodiments, threshold for normal may be defined as a baseline of the environment of the test-taker established prior to beginning the exam. The system may perform an analysis on the environment (e.g., light sound, and/or movement) and calibrate the system to that baseline. In certain embodiments, that baseline must fall into an acceptable range prior to starting. In other embodiments, normal may be defined by the institution or instructor. For example, if an instructor allows for the use of an external resource such as a book, then the system may know that there might be occasional breaks in gaze and loss of face as the user references the book. According to further embodiments, establishing the baseline of the environment may also take into account initial biometric information obtained of the test-taker prior to beginning the exam.

In some cases, the system may stop the exam in the event of blatant attempt at cheating. A live proctor may also use a chat feature or voice communications to speak the test-taker while in the exam. For example, in the event the exam was stopped by the system, a human proctor might be required to review why the exam was stopped and then allow the test-taker to continue after a brief investigation. Finally, during the exam session, the test-takers webcam video, microphone audio and computing device display may be recorded for later review by a proctor/reviewer or exam administrator/instructor.

In certain embodiments, exam administrators/instructors may interact with the system through their test-delivery platform or LMS. The exam administrator/instructor may have the ability to configure some settings of the system. These settings help define the system's rules for engagement and event tracking during a test-taker exam session. After the exam session, the exam administrator/instructor can review the recorded session and review the events/flags that were created by the system. In addition, the exam administrator/instructor can read any notes left by the proctor/reviewer and view some statistics about the session in relation to other similar sessions. Lastly, the exam administrator/instructor can view reports that detail information about completed exam sessions.

According to certain embodiments, proctors/reviewers may interact with the system through an exam scheduling system that can store and access the live and prerecorded test-taker exam sessions for live proctoring or post-test session review. The proctors/reviewers can see these sessions in a queue or list view that details if the session is being observed, or has been observed. This way, the proctors/reviewers will not attempt to observe the same sessions at a time. Next, while the proctor/reviewer is observing or reviewing the session, they can see the rules for exam, view the events/session flags, view the webcam video, listen to the audio, see the test-takers desktop and communicate with the test-taker via chat or audio in the event the session is still active. Lastly, during the live session or post exam review, the proctor/reviewer may have the ability to create, update, or delete session events.

System Administrators may interact with the system through the configuration settings for the institution through an exam scheduling system. The system administrator can define and update such settings such as application programming interface (API)/learning tools interoperability (LTI) keys, behavioral thresholds and sensitivities. In addition to these functions, the system administrator may also perform all the same functions as the exam administrators and proctors.

When test-takers decide to cheat on their exams, cheating behavior may be described by measurably consistent patterns. A system according to certain embodiments may therefore be configured to recognize these distinctive patterns and automatically refine and update them using supervised machine learning. In certain embodiments, parts of the system that may be configured to recognize the distinctive patterns and automatically refine and update them using supervised machine learning may include a media and/or a processing server discussed herein. As such, certain embodiments may allow for honest test-takers to have an automated, efficient, and convenient experience, while others may be flagged and observed live or reviewed after the exam session has completed. Not only does this increase the user experience, but it can also enhance efficiency and the ability to scale various services provided by certain embodiments.

Reference is made to FIG. 1 in which a system, generally indicated as 10, is provided which enables remote proctoring of an exam, even in parallel with an online exam administered to a student 14. System 10 includes a server 12 operatively communicating with a database 22. Server 12 communicates with students 14 at a student computer 16 through internet 18. Server 12 may also communicate with third party databases 20 such as institutions of learning (where exams may be stored), identity bureaus (where identifying data about a student is stored), or even provider's executable programs (such as exams or scheduling functions such as the virtual classroom to be discussed below) in one embodiment of the invention.

In certain embodiments, server 12 provides an interactive web based portal such as a web page for interacting with student 14. It should be noted that a webcam 24 is associated with computer 16.

Similarly, server 12 provides an interactive web based portal for proctors 34 and a proctor computer 30, which is also equipped with a webcam 32. Server 12 enables two-way audiovisual communication between computer 30 and computer 16 utilizing webcams 32, 24. It should be noted that computer 16, 30 may be any interactive device which allows each of student 14 and proctor 34 to communicate with each other utilizing the functionality described below. It should be noted that the preferred embodiment is an internet-based system to facilitate the use of server 12 and third party database 20 with its associated servers. However, the computing device may be anything compatible with a webcam or other real time audiovisual device and capable of such communication utilizing either the internet, radio frequency, telephone, cable TV, handheld personal data accessories or smart cellular phones by way of non-limiting example.

It should be understood as well, that all of the functionality described below is capable of being performed by server 12 utilizing data stored at database 22. However, in a distributed network such as distributed network 10, it is contemplated that certain data and certain functionality may also be provided by third party 20 platforms. So by the way of example, server 12 may create the platform for two way audio visual communication, or provide the handshake between computer 16, computer 30 and a third party 20 platform.

Figure 7:
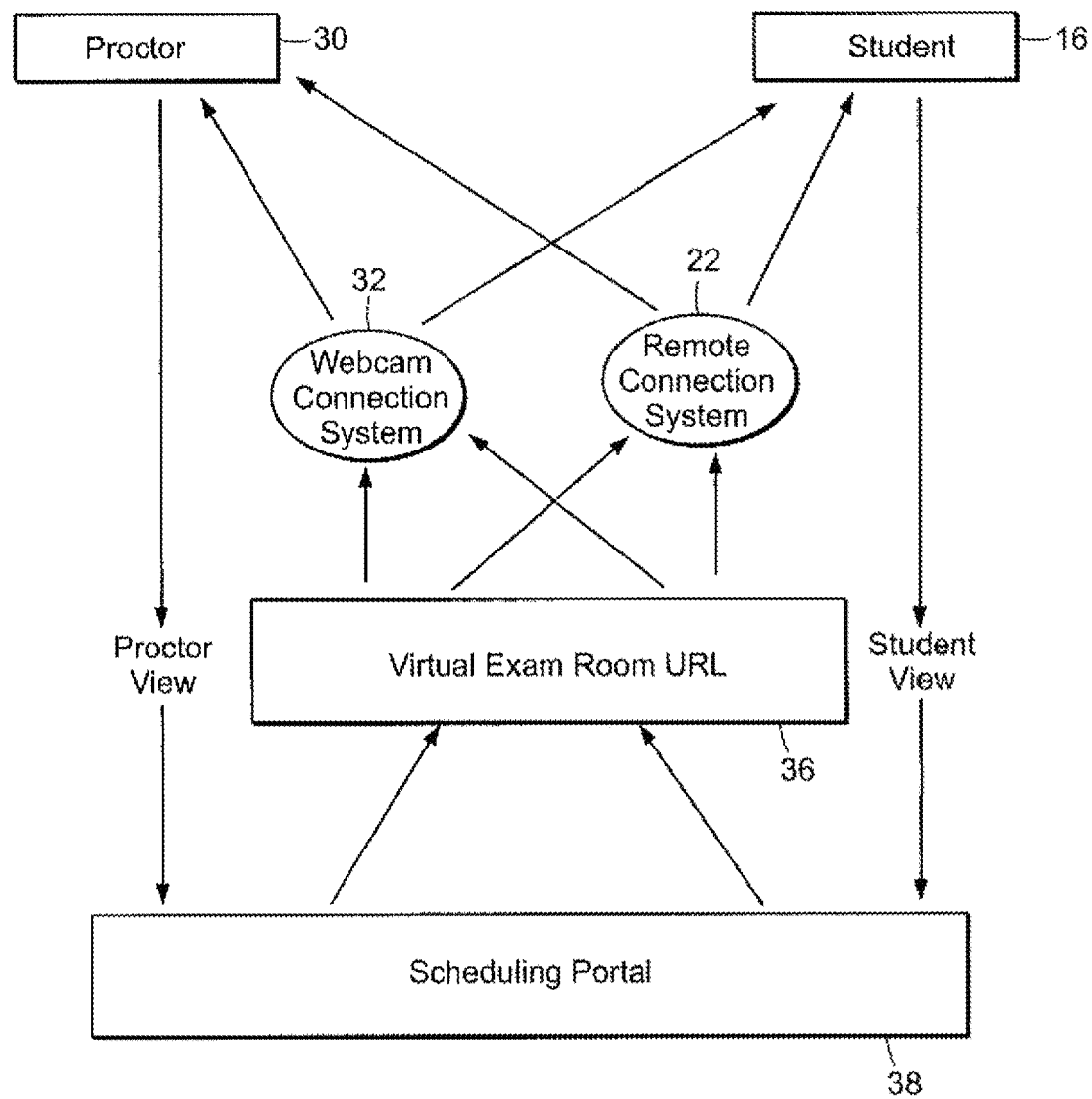
FIG. 7 is a flow diagram of the operation of the system in accordance with the invention.

Reference is now made to FIG. 7 in which a schematic diagram of the operation of system 10 is provided by way of background. In general, server 12 facilitates the activation and use of virtual exam rooms 36. Virtual exam rooms 36 are virtual constructs, which mimic the functionality of a real world exam room in that it is a "place" in which an exam may be administered under the supervision of a live proctor 34 at proctor computer 30.

As will be described in greater detail below, virtual exam room 36 is a platform, which enables the functionality, which creates an exam room in response to a scheduling request. In other words, virtual exam room 36 is a communication between proctor computer 30 and student 16 reserved and enabled for a specific time and date and enabled upon server 12 confirming the availability of a time and date for the administration of an exam to a requesting student 14. Virtual exam room 36, as it "goes live" also is enabled for the proctor and student webcam servers, monitoring of the student computers, presentation of the exam to the computers in the virtual exam room and third party authentication. It connects these applets in a website page.

Generally, a student 14 utilizes student computer 16 to communicate with server 12 to access a scheduling portal 38. Scheduling portal 38 provides a student with a schedule of available time periods by date and time during which an exam is capable of being proctored utilizing the system of server 12. Student 14 selects an available date and time, which causes the creation of a virtual exam room 36. A proctor 34 utilizing a proctor computer 30 also accesses scheduling portal 38 to identify exam times for which a proctor 34 may be needed, or a schedule of virtual exam rooms 36 to which proctor 34 has been assigned.

The virtual exam room 36 provides the linking platform between proctor computer 30 and student computer 16 as a proctor 34 and a student 16 are both assigned to a virtual exam room 36. Utilizing virtual exam room 36 and utilizing respective webcams 24, 32 and a communication platform provided at server 12, or from a third party 20, student computer 16 and proctor computer 30 provide images respectively, in real time, of the proctor 34 and the student 16 making use of the virtual exam room 36 to administer an exam. Virtual exam room 36 also enables proctor 34 to view what is being displayed on a screen of student computer 16.

Human proctors are utilized by the invention to monitor students 14 taking exams in real-time. Since the majority of all exams taken outside of a classroom environment are delivered online, in a preferred non-limiting example, the internet 18 is used for connection between the student 14 and proctor 34. The rest of the process is performed in a set of logical steps.

The Student Process

The process begins with student 14 accessing a Scheduling Portal 38, a website that server 12 runs utilizing database 22. A student 14 wishing to schedule a time to be proctored is provided with a login to the Scheduling Portal 38 (FIG. 2). As student 14 enters log in formation, server 12 creates a unique user number that is entered into the database 22 and is the identifier for all data collection related to this student 14. As student 14 creates their login they are prompted by server 12 to enter contact information into system 10 including mailing address, phone numbers, and email addresses by way of non-limiting example. Student 14 is also prompted to enter their local time zone at computer 16. Once the time zone is entered, all presentations of appointments and current time are presented to student 14 in their indicated local time.

Once an appointment time is created by server 12 as a function of student inputs at scheduling portal 38, the appointment time is stored in database 22 arid recorded in Coordinated Universal Time (UTC). System 10 maintains a central clock that runs on UTC and is constantly updated.

Times are converted by server 12 checking the database 22 record associated with the student 14 to determine what time zone they have selected. Server 10 then retrieves the recorded difference between UTC and the student's time zone from database 22 and makes the addition or subtraction to the UTC time of the appointment. The server 12 also tracks dates when the difference is set to change for Daylight Savings Time and makes the necessary addition or subtraction. This new time is the one shown to student 14 at computer 16. All times are converted before an email is sent to the student confirming information about the time and date of an exam.

All times displayed on any web page in the schedule are converted to the student's time zone before being written to the page presented at computer 16. For example: if a student 14 makes an appointment for 11:00 AM Central Time, server 12 checks the current difference between UTC and Central. Since the difference may be −6, in this example, server 12 adds 6 hours to the appointment and records it on the schedule at 5:00 PM, which is UTC time. When the student is emailed the confirmation for this appointment, the system will check database 22 for the student's time zone. Server 12 determines that the appointment is recorded at 5:00 PM UTC and that the student's time zone is Central Time. Server 12 then checks database 22 for the difference between Central Time and UTC and returns −6. Server 12 then takes 5:00 PM and subtracts 6 hours to get 11:00 AM. This 11:00 AM time is then inserted into the email delivered to computer 16.

Once a login account is created for student 14, student 14 has the ability to login at a login page 200 to system 10 at any time using the credentials they entered in the sign up process. Upon the next login, student 14 is given the option at a scheduling screen 300 (FIG. 3) to select a date and time they wish to take an exam. Available dates 306 and times 310 are shown as white boxes 302 on a calendar grid. White boxes 302 can be selected at computer 16 to add an appointment at the corresponding date 306 and time 310. Dark squares 304 indicate unavailable times.

As will be seen, system 10 utilizes live actual monitoring of student identification and behavior, therefore each student 14 must be assigned an available proctor 34. This schedule is a function of school parameters such as exam date, time and duration, by way of non-limiting example, on the one hand, and proctor 34 availability and the maximum number of students that can be handled by a single proctor 34 on the other Server 12 determines open dates by enabling an available virtual exam room 36 as a function of exam and proctoring rules created as a function of the school parameters stored at database 22. These virtual exam rooms 36 are stored in database records with associated variables held in other database records. These variables control an associated URL of the page student 14 is to be sent to take their exam. In other words, server 12 may send student 14 to a virtual room 36 created by a third party 20, or create virtual rooms itself as a function of data stored in database 22. The variables may include the room's name, which is usually a number. The name of the virtual exam room 36 is mapped in database 22 to the login information required by the proctor 34 to connect the webcams 22, 32. The number of exam rooms 36 also may correspond to rules governing the capacity of exams that can be proctored at any given time as stored in database 22 (see FIG. 10).

Each virtual exam room 36 has time slots allocated to allow an exam to begin at staggered intervals controlled by an administrator, which is currently set at 15 minutes (see Admin Console Section below). This allows for a single proctor 34, but multiple students 34 in a virtual exam room 36. Only one exam appointment can be active in a virtual exam room 36 at a time, i.e. have a proctor 34 actively communicating with a student 14, such as during the identification process discussed below. Virtual exam rooms 36 can be added and deleted in the Admin Console.

System 10 relies on live proctoring in a virtual exam room 36. Because proctoring is live, the system must be enabled to control the rate at which proctoring occurs. In this way, a single proctor 34 is not overwhelmed in its attempt to initialize exams for a large number of students 14 as initialization requires the steps of identity confirmation, environment validation (e.g. no extraneous materials are present in a closed book exam by way of example), in addition to the visual monitoring of the administration of the test once initialized. To this end, proctor 34 or an administrator of several proctors 34 is provided with a throttle function to control the flow of students 14 scheduling exams requiring proctoring.

Reference is made to FIG. 10 in which a screen shot 1000 shows a general settings input including an input page 1002 for inputting the manner in which reservations may be made such as in the instant case in which only a single exam may be started at any one time and no more than five exams may be proctored concurrently by any one proctor. It should be noted, that this is the gating function in the system and intentionally so. It controls the number of exams, which may be given in a virtual classroom 36 at the same time. Therefore, it controls the number of exams, which may be scheduled before a white box 302 is converted to a dark box 304 at scheduling portal 38 by server 12.

The schedule also has a "throttle" for exam capacity. This functionality allows changes to the number of virtual exam rooms 36 available for students 14 to reserve and will also affect the availability a student 14 will see when they attempt to add an exam. This is done by the proctor's administration through an Admin Console (see Admin Console Section). Operationally, human proctors can only manage starting a maximum of two exams at the same time. As discussed above, the throttle function allows management of how many proctors must be working at once by controlling the number of exams that can begin at the same time and how many exams that can run simultaneously.

For example: System 10 has ten active virtual exam rooms 36, and a student 14 wants to schedule a two-hour exam at 10:00 AM. Server 12 will search for an exam room 36 that is open from 10:00 am until 12:00 pm. Once it finds a room 36, it will operate on the throttle settings stored in database 22 to determine how many exams are allowed to begin at once. Server 12 then determines whether adding the requested appointment will keep it under that number. Server 12 then checks the throttle values to determine the number of simultaneous exams allowed and determines whether adding the appointment in that time frame will keep it under that number. Once all of these conditions are met, server 12 adds student 14's appointment to the schedule 300.

As discussed above in connection with FIG. 7, server 12 enables a platform for scheduling a virtual exam room 36, and as will be seen below, at the time and date scheduled, enables communication between a computer 16 and computer 30 utilizing respective webcams 24, 32. This allows a third party 20 (which cumulatively and alternatively represents a server and database of non-proctoring entities) such as a university to make available at its server the exam for access by computer 24. In this way, the proctoring provided by server 12 and the exam provided by third party 20 run in parallel, without interference, at computer 24. It is not necessary, unless desired by third party 20, for proctor 34 to have access to or see the exam itself. In this way, system 10 provides an exam platform agnostic proctoring system.

Each third party institution 20 is given the opportunity to customize its interface for their test-takers, so a student 14 will indicate the exam they intend to take by either typing the name of the exam into computer 16 or selecting at computer 16 from a pre-populated exam list provided at a web page provided by a third party 20 or server 12. Third party 20 can set an infinite number of variables associated with each exam. Some of these variables can include the dates and times the exam is available, the name of the exam, the associated faculty member, and exam length. These variables can be stored at database 22 either manually by proctor administrators through the Admin Console (See Admin Console Section). They can also be populated automatically from the institution's own database 20. This is done by the institution making the data available in a readable format to server 12 (for example, an XML file). The data from the institution's system is requested and returned to the server 12 any time a student wishes to add an appointment.

Figure 3:
FIG. 3 is an example of a scheduling screen presented in accordance with the invention.
Figure 12:
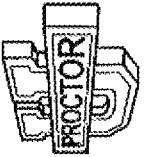
FIG. 12 is an exemplary screen shot enabling student to schedule an exam in accordance with the invention.

No matter the method that the exam variables are entered into system 10, the same process is performed by student 14 when attempting to add an appointment. Student 14 selects a date and time they wish to take an exam at page 300 of scheduling portal 36 (FIG. 3). Server 12 provides a reservation page 1200 at computer 16 and server 12 populates a drop down list 1202 of available exams with data from third party 20 or stored in database 22 with each entry (FIG. 12).

Figure 4:
FIG. 4 is an exemplary screen shot of a reservation interface in accordance with the invention.

Student 14 selects any variables that the institution desires at a page 400 (FIG. 4). When the student 14 selects the exam and attempts to add it to the schedule 300, server 12 will first determine the associated database entries to determine whether the exam is available at the date and time the student 14 is requesting. If it is not, server 12 sends student 14 an error message at computer 16 and is advised by server 12 as to when an appointment is available. If the exam is available in the time frame student 14 is requesting, system 10 performs its normal set of checks for available virtual exam rooms 36 as a function of rules including throttle settings. If server 12 determines that settings allow it, an appointment for student 14 is added to the schedule 300.

Student 14 is given the opportunity to print a confirmation page and server 12 sends a confirmation via email to computer 14. Student 14 is then returned to the calendar grid 300 of scheduling portal 36.

Figure 6:
FIG. 6 is an exemplary screen shot showing the beginning of an exam.

Server 12 generates a countdown clock by comparing current time to the scheduled appointment time, which is displayed as a clock 308 in the schedule 300. Clock 308 counts down until the time the exam is scheduled to begin. This countdown clock is calculated by server 12 first recognizing that the student 14 has an appointment on the schedule 300. Server 12 then takes the time of the next appointment student 14 has on schedule 300 (in UTC) as stored in database 22 and subtracts the current date and time (in UTC) from the appointment date. The difference is then displayed on the schedule grid page 300 as clock 308 and is periodically updated; every second in a preferred embodiment (FIG. 6). Once the exam is scheduled to begin, the countdown clock 308 becomes a button 312 the student can select to begin the proctoring session (FIG. 6). This process is done when server 12 calculates the difference between the appointment time and current time is zero or a negative number. The button, in a non-limiting embodiment, is an html link to a URL that corresponds to the virtual exam room 36 in which the student's appointment is scheduled.

Once the student selects virtual button 312, server 12 provides a new page at computer 16 to begin the proctoring process. The first step is to connect proctor 34 and student 16 via a live webcam session. The new web page automatically detects the student's webcam 24 and connects them to a live proctor's 34 webcam feed at computer 30 and webcam 32 (FIG. 8). This is done via a live video conference executable application into the page. This process may be done in a preferred embodiment through a platform provided by third party 20, but can also be done by server 12. The webcam connection allows the student 14 and proctor 30 to see and hear each other. The proctor 30 then greets the student 14 and talks them through the next steps.

Student 14 is then instructed to proceed to the next step utilizing an interface 800 (FIG. 8, step two). Student 14 initializes a remote connection to proctor 34, which allows proctor 34 to monitor the student's screen and system for computer 16. The connection also allows the proctor to control the peripherals (mouse and keyboard) of computer 16 and monitor the system health of computer 16, which aids in technical support needs. This is done through a third party 20, but can be done by server 12. This method currently works on both Windows and Mac computers. This capability is tied to the technology used, whether from a third party or from server 12.

From there, the student 14 is instructed to prove their identity through an approved authentication method. Examples of authentication methods include: Proctor 34 instructs the student to present picture identification to webcam 24. The type of identification acceptable is determined by the institution for which the student 14 is taking the exam and stored either at database 22 or third party database 20 and sent to proctor 34 as part of the process. Student 14 may also be asked to enter their name and home mailing address into a pop up window presented at computer 16, but monitored at server 12 and/or computer 30. This data may be transmitted to a third party 20, which in response returns a series of questions generated from data stored at third party database 20 related to the student 14 at computer 16. This could be public and privately purchased data that deals with previous addresses, real estate history, old phone numbers, and other types of information generally known collectively only to the student 14 by way of non-limiting example. Student 14 is to answer the questions while proctor 34 watches via webcam 24 and remote connection. If student 14 scores a high enough percentage on the authentication exam, they are allowed to proceed.

The percentage can be determined by the institution or proctor 34. The passing or failing of this authentication exam, as well as the contents of the questions are stored in the database of third party 20. The student may also have a picture taken of them through webcam 24 by the proctor 34. This picture is then stored in database 22 and associated with student 14. It can be viewed by proctor 34 at any time to verify that the appearance of the student 14 who has connected via webcam 24 appears to be the same student 14 who has taken previous exams. Any combination or all of these three methods can be used to authenticate a student's identity at the discretion of the institution.

After the completion of the steps above, student 14 is instructed to begin the exam, if the exam is being delivered online, student 14 is directed to open another browser window and navigate to the exam on the website of third party institution 20. System 10 does not require the exam to be delivered in any specific fashion and works with any LMS. The reason the system works with any LMS is that system 10 enables viewing at computer 30 the images displayed on computer 16 so that proctor 34 is simply monitoring what is being shown on the student's monitor. For example, if an institution wants the student to use a Microsoft Word during the exam, the proctor simply monitors the student doing so and makes sure they use nothing else. This allows system 10 to be platform agnostic. The proctoring is going on in parallel with whatever else student 14 is doing on computer 26.

If the exam is being delivered via paper, proctor 34 will instruct the student to complete the exam while on webcam 24 and will make sure student 14 completes it in the manner directed by the institution.

After the exam is complete, student 14 "clocks out" by entering an end instructed at computer 16 and proctor administrators, as well as selected administrators of the institution, are able to generate Activity Reports 900 (not shown) detailing all past proctoring sessions, if the exam times out then proctor 34 can also end the exam from computer 30, or server 12 may discontinue access to the exam. Any variable that the institution wishes to be tracked can be displayed from this report. The report is generated by providing to computer 30 a number of drop-down menus 1302 at a page 1300 that contain variables that allow the Administrator to narrow down the data that is displayed in any given report (FIG. 13). The number of drop-down menus can be customized at the desire of the institution. A report 902 can contain, but is not limited to, pictures 904 of the student 14 who appeared on the webcam (if it was recorded), the start 906 and end 908 times of the exam, the time the student began and ended the exam, and notes 910 from the proctor (FIG. 9) shown at screen 900. Administrators are also able to see future exam appointments, manage lists of exams, and monitor daily schedules.

The Proctor Process

Operation of system 10 will now be explained as utilized by proctor 34. Proctors 34 are provided a different type of login into the System 10. These system 10 logins allow the proctors 34 to access the schedule 300 of scheduling portal 38 in a view that allows proctors 34 to quickly see the information at computer 30 they need in order to proctor efficiently.

Figure 11:
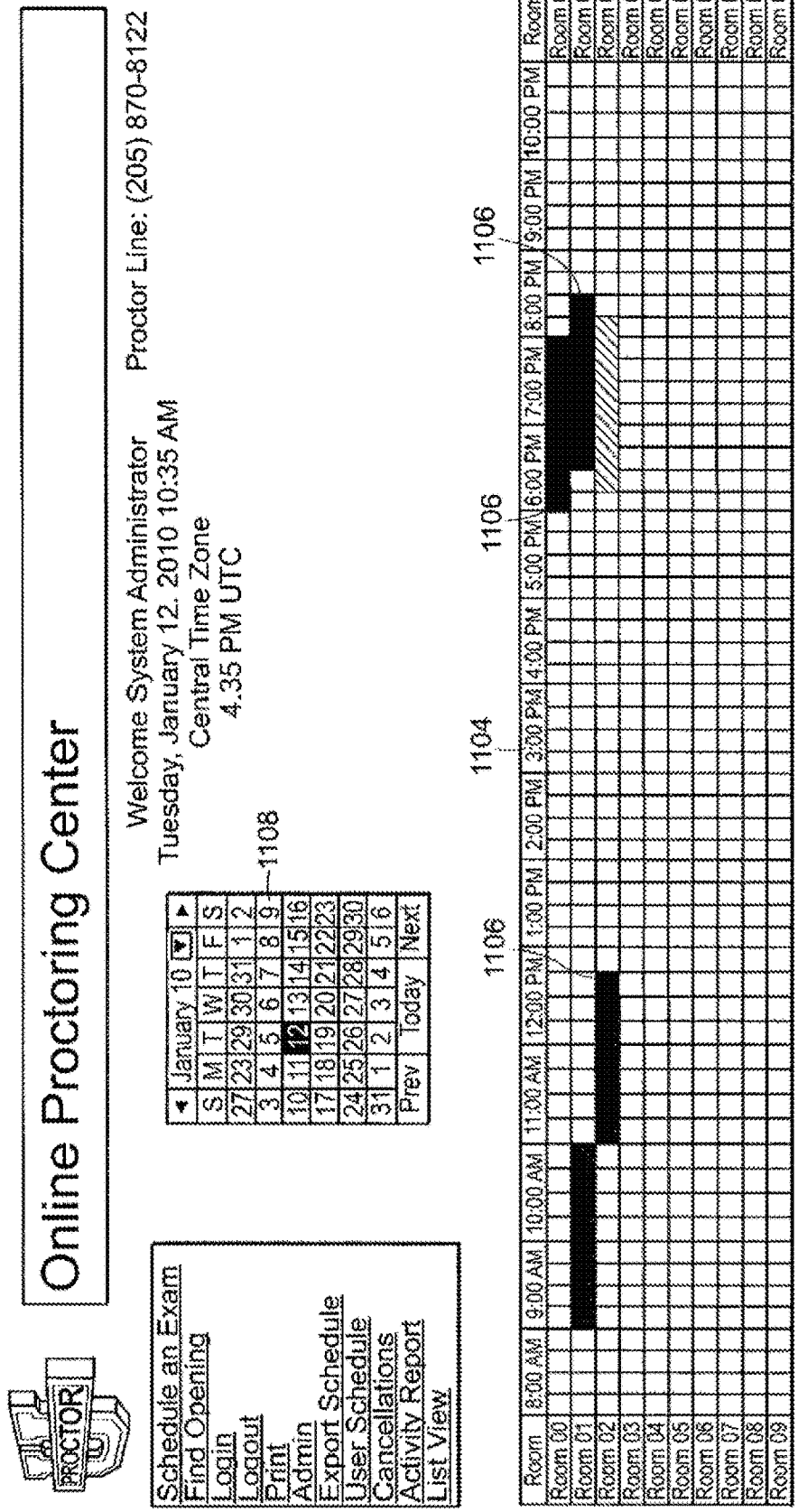
FIG. 11 is an exemplary screen shot of the administrator screen showing the administration schedule in accordance with the invention.

Proctors 34 login from computer 30 though login process similar in operation to that used by a student 14 (FIG. 2). Once proctor 34 logs in, server 12 provides access to a page 1100 at computer 30 that displays the schedule 1102 in "Proctor View." Schedule 1102 is displayed showing the total number of virtual exam rooms 36 and all potential start times 1104 for the current day (FIG. 11). All proctor 34 appointments 1106 for that day are displayed in line with their corresponding virtual exam rooms 36 and the time they are set to begin. All appointments 1106 are color-coded by the institution for which the exam is being proctored. These colors are set in the Admin Console (see Admin Console section). This allows the proctor 34, at a glance, to know what login information to use to connect the webcams and what school's guidelines are to be consulted for this appointment 1106 as stored in database 22.

Above the display of virtual exam rooms 36 is a calendar 1100 accessible from computer 30. Each day on calendar 1108 can be accessed to display all appointments for that day in the corresponding virtual exam rooms 36.

Figure 14:
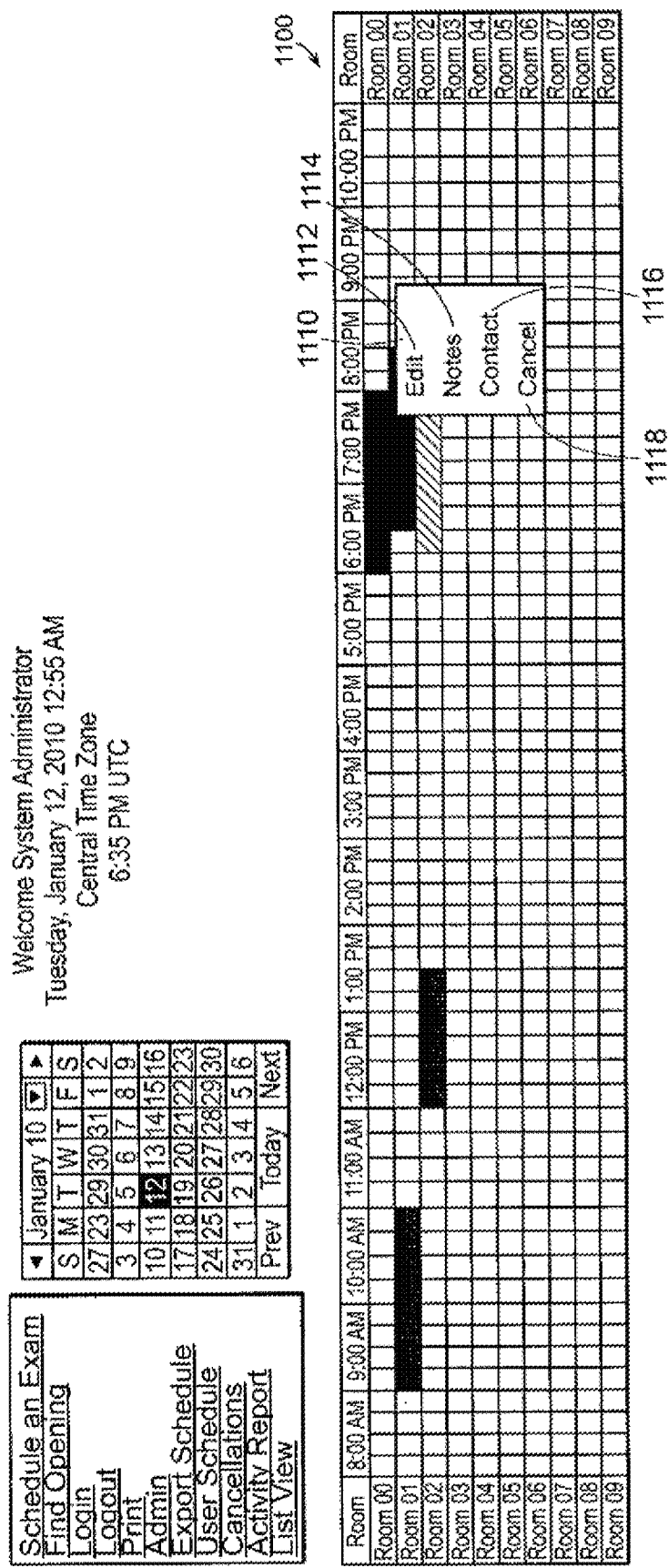
FIG. 14 is a screen shot showing the manner in which a proctor accesses an appointment in accordance with the invention.

Any appointment on the schedule can be clicked by a proctor 34. This will provide an accessible menu on page 1100 that offers proctor 34 the following options: Edit; Notes; Contact; and Cancel. (FIG. 14).

The Edit Function: When the proctor 34 selects Edit button 112 at computer 30, server 12 connects proctor 34 to a new page 1500 that pulls all data from the database 22 or third party 20 associated with this appointment 1106 (FIG. 15). Proctor 34 can edit any variable associated with this appointment 34. This can include, by way of example, but is not limited to the following: The ability to change the student 14 listed with the reservation 1106; The ability to change the name of the exam; The ability to change the start and end times of the appointment 1106; The ability to change the notes the student may have left at the time the appointment was made.

The Notes Function: By selecting Notes button 1114 server 12 provides access to a window that allows a proctor 34 to add text to database 22 and associate this text as "notes" about the proctoring appointment 1106. The notes may included, by way of example, but are not limited to, something student 14 did during appointment 1106, something proctor 34 noticed, or technical issues proctor 34 had connecting to the student 14. This data is displayed in the Activity Report 900 and can be viewed by proctors 34 and administrators from the institution.

Figure 16:
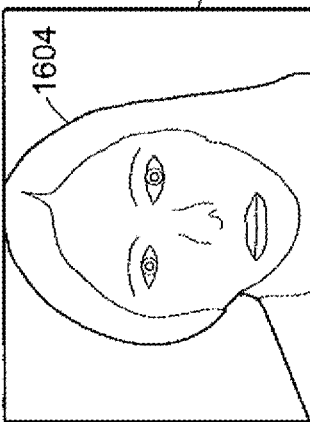
FIG. 16 is an exemplary review of a contact window for the proctor to access contact info for a particular student in accordance with the invention.

Contact Function: By selecting Contact button 1116, server 12 provides a pop up window 1600 that contains the contact information 1602 contained in database 22 that corresponds to this student's account (FIG. 16). Pop up window 1600 may also display the picture 1604 on file for that student 14, allowing the proctor to verify visually the student's identity as apart of an authentication process.

Cancel Function: Selection of Cancel button 1118 causes server 12 to allow proctor 34 to cancel an appointment 1106. A reason for cancellation may be included in a text box that will be recorded in database 22 and linked to this appointment 1106. This information can be pulled from the "Cancellation Report" in the Admin Console (see Admin Console).

Figure 17:
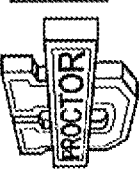
FIG. 17 is an exemplary screen shot of a proctor's administrative console in accordance with the invention.
Figure 20:
FIG. 20 is an exemplary screen shot enabling the setting by the school of the exam parameters in accordance with the invention.

Proctors also have access to the Admin Console, which provides certain degrees of initialization and administrative control over system 10 and will be described below. Proctors 34 and Administrators have access to a Scheduling Portal's Admin Console 1700 (FIG. 17). In the Admin Console 1700, variables contained in database 22 that control mainline settings of the Schedule Portal 36 can be edited.

The Schedule Button: Selecting Schedule button 1702 from Portal's Admin Console 1700 causes server 12 to return the page displayed at a computer to the "Proctor View" of the schedule 1102.

Figure 18:
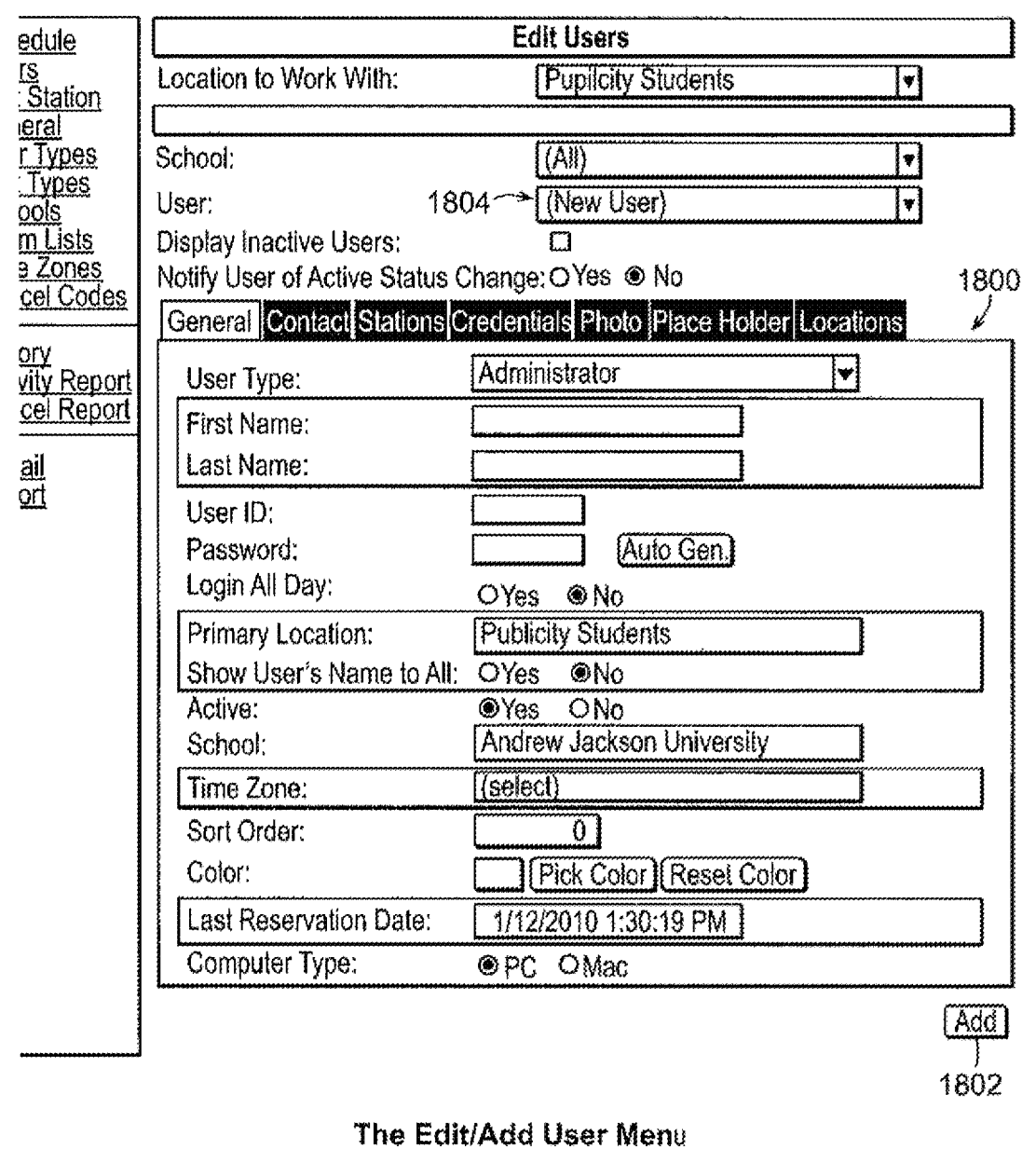

The Users Button: By selecting a Users button 1704, server 12 enables an Administrator to add, edit, and delete information about all proctors 34, administrators, and students 14. This is done through a menu 1800 that allows displays of all profile information for each account (FIG. 18). If the Administrator wishes to add a new user, they enter the information from a remote computer corresponding to the new user and select the "add" button 1802 Server 12 causes a new set of records to be added to the database 22 and the user is given a unique User Number. If the Administrator wishes to edit an existing user, they select the user's name from the drop down box 1804 labeled "User." All existing profile data in database 22 for the user is displayed and can be edited by the proctor 34. When finished, selecting the "Update" button (not shown) will cause server 12 to update all the information associated with this user in database 22. Selecting a "Delete" button will cause server 12 to delete all information about the user from the database 22.

The Test Station Button: Selecting a Test Station button 1706 causes server 12 to enable the Administrator to create and edit all of the virtual exam rooms 36. A drop down box appearing at their computer enables administrators to select an existing exam room 36 or add a new exam room 36. All of the variables mentioned in the virtual exam room section above can be edited here. Virtual exam rooms 36 can be deleted from the database 22 (or third party 20) by selecting the exam room 36 in the drop-down menu and selecting the "delete" button.

The General Button: Selecting General button 1708 causes server 12 to enable an administrator to edit many of the general settings of the site such as the throttle rate at page 1000 (FIG. 10). In addition to these functions, the main contact information for the site is edited here. Administrators can also use this section to edit the hours of available time slots by selecting an "open and close" time. This changes the displayed time slots that are shown to proctors 34 and students 14 in the schedule grid 300. The increment at which time slots are available (currently set at 15 minutes) can be changed here as well. The Terms of Service for the site can be edited here as well.

The User Types Button: Selection of a User Type button 1710 causes server 12 to enable the Administrators to edit the data stored in database 22 for different types of users in the system, such as "proctor," "student," and "institutional admin." In editing these user types, variables that control their access to certain sections of the schedule 300 and Admin Console 17 and permissions to perform certain access can be edited here. Some of these variables include, but are not limited to, the ability to add appointments, the ability to view proctor comments, and how long a user is allowed to stay logged into the system without being prompted to re-enter their login credentials.

The Schools Button: Selection of a Schools button 1712 causes server 12 to enable an Administrator to add, delete, and edit data about an institution stored in database 22 (FIG. 19). Server 12 provides access to a page 1900 where settings for institutions can be customized. The sections include, but are not limited to, setting up the school to use exam lists (specific settings for each list is controlled as described in the Exam List section); and editing the email message that is sent to a student 14 of the institution when they make an appointment.

The Exam Lists Button: Once an institution has been edited utilizing page 1900, the Administrator selects the Exam Lists button 1714. Server 12 in response to selection of the Exam List button 1714 enables an Administrator to add exams to database 22 or edit exam information in database 22. As discussed above, each exam from each institution and variables associated with it are stored and mapped in database 22. These variables may be set, edited or deleted as discussed above in the Exam List and Appointment Section.

The Cancel Codes Button: Selecting a Cancel Codes button 1718 causes server 12 to enable the Administrators to set generic reasons that proctors 34 can select when canceling a student's exam appointment.

The History Button: Selecting a History button 1720 causes server 12 to enable an Administrator to access reports from database 22 on the addition of users, the addition or changing of appointments, and the changing of system settings as stored in database 22 as server 12 performs the functions discussed above. All changes in database 22 regarding these functions are logged in another section of the database, allowing for change reports to be displayed. This information is used for troubleshooting a problem after it appears to have happened to pinpoint the changes that may have caused it.

The Activity Report Button: Selecting an Activity Report button 1722 causes server 12 to provide Administrators with access to the same Activity Report 900 that institutional administrators use.

Figure 21:
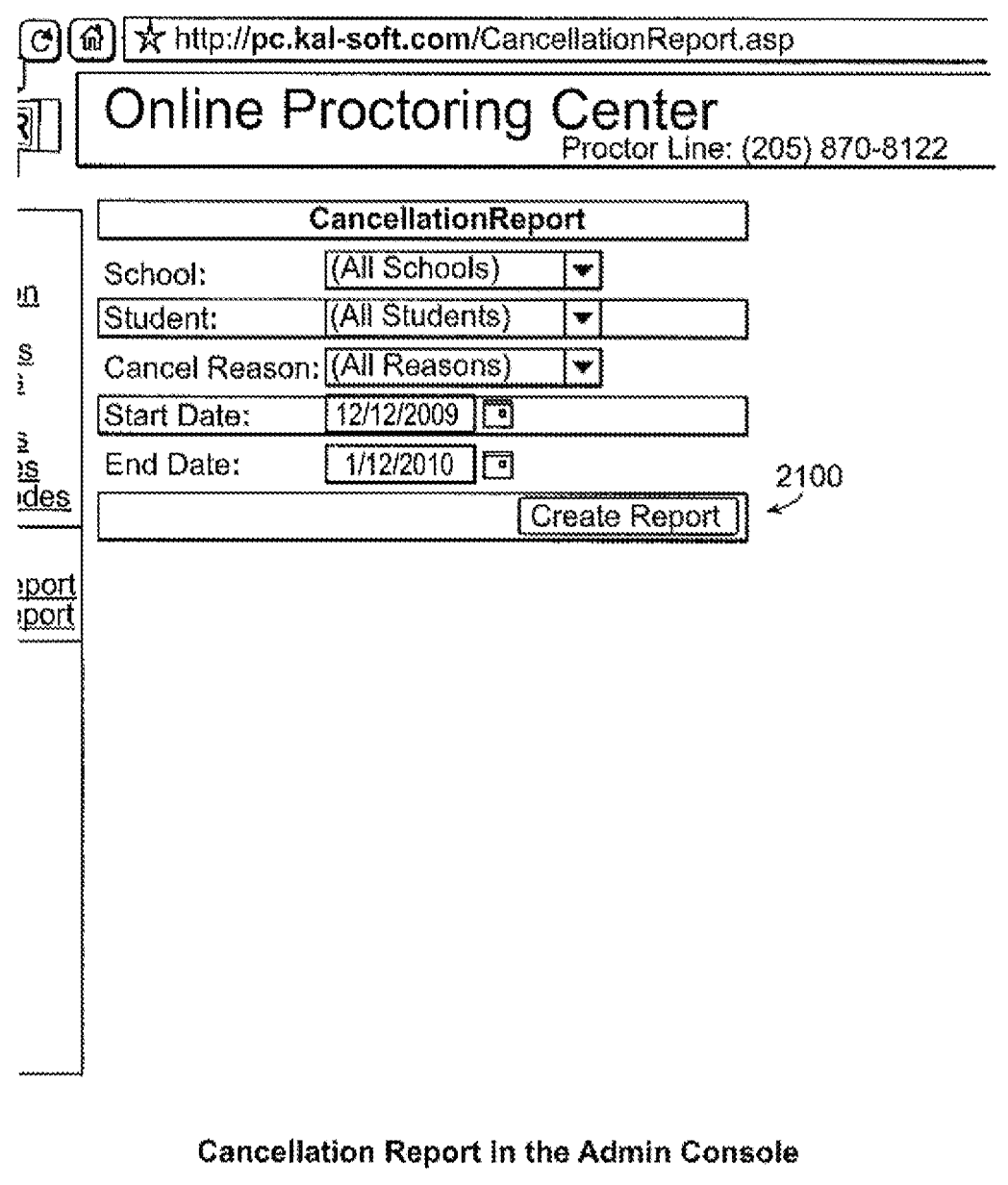

Cancellation Report Button: Selecting a Cancel Report button 1724 causes server 12 to provide Administrators with access to report on all appointments that have been deleted or canceled. In the same manner that Activity Report 900 is generated, relevant variables can be selected at a page 2100 to narrow the data returned so that all that is used is the information desired (FIG. 21).

Email Button: Selecting Email button 1726 causes server 12 to enable Administrators to send an email to any or all users of Schedule Portal 38 at the email address recorded in the database 22 that corresponds to their user profile.

The innovation behind the above approach is the virtualization of the traditional classroom testing experience. The use of human interaction combined with authentication methods maximizes the security and integrity of the proctoring session without making the process difficult for the student. Other systems focus on automation and not monitor in real time.

Figure 22:
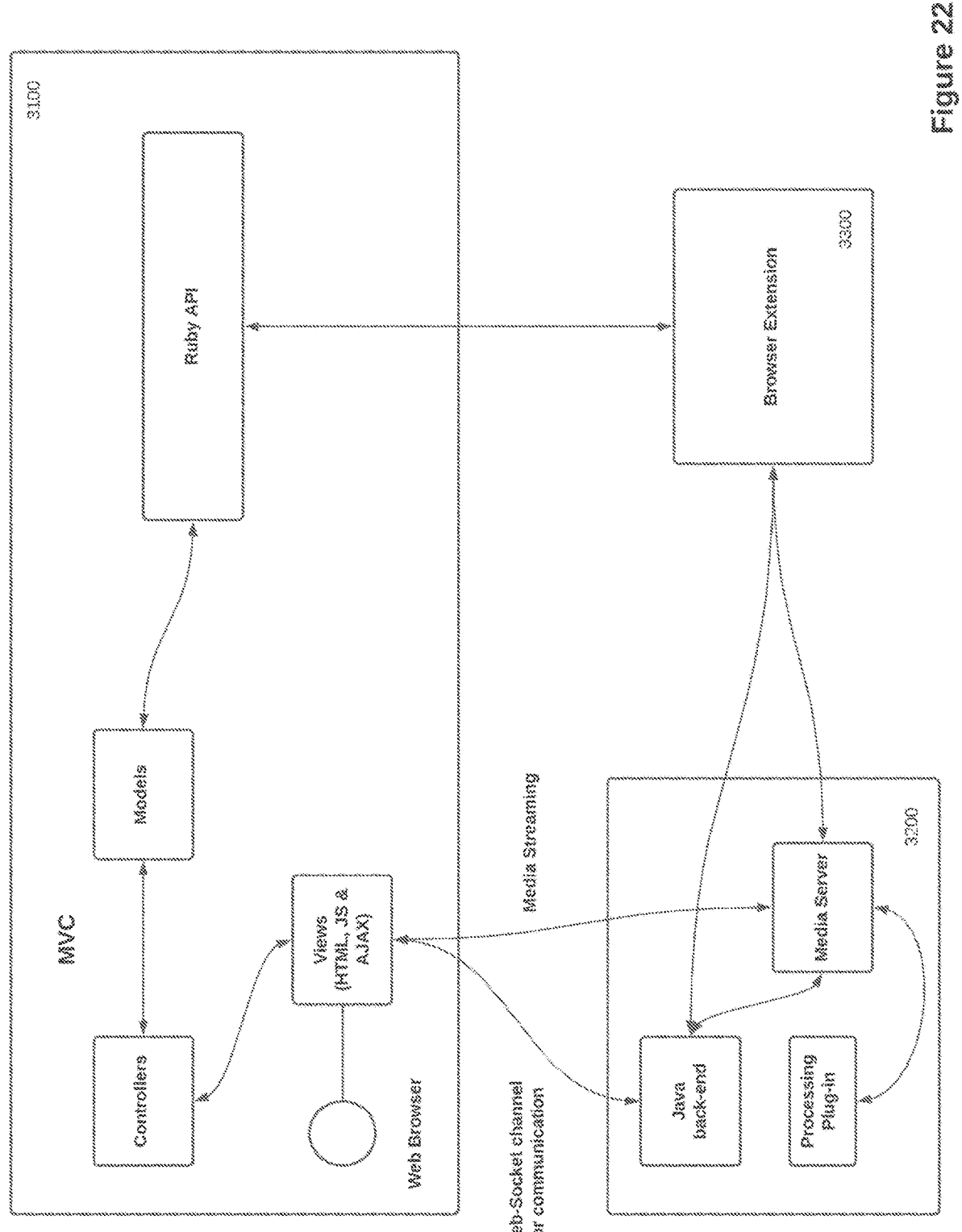
FIG. 22 illustrates a system according to certain embodiments.

FIG. 22 illustrates a system according to certain embodiments. The system may include a scheduling system 3100. Such a scheduling system may be used to create a proctoring platform. Although FIG. 22 illustrates a scheduling system, other technologies may be used to create the proctoring platform in other embodiments. The scheduling system 3100 may be responsible for storing and processing data that pertains to the sessions. The scheduling system 3100 may also be the ideal interface used to aggregate, process, and display data for all users, which may include test-takers, proctors, and institutions. The data may include, but not limited to appointment date/time, user information, session rules, session events, session timeline, session recordings, session authentication, session notes, session photos, exam information, test taker device input, and proctor input. Further, the scheduling system 3100 may be based on a model, view, controller architecture, and may support an application programming interface that is used to transfer data between different components. In addition, the scheduling system 3100 may configure all aspects of the session.

FIG. 22 also illustrates that the system may include a media server component 3200. The media server component 3200 may be responsible for recording, streaming, and processing audio and video. Further, audio and/or visual data may be streamed to the media server component 3200. In addition, the media server component 3200 may analyze and parse the stream for various data points such as, but not limited to: face detection; face profile detection; lighting levels; audio levels; motion levels; and object detection.

FIG. 22 further illustrates that the system may include an end-user software component 3300. The end-user software component 3300 may receive most of the interaction. In addition, the end-user component 3300 may be responsible for transmitting and displaying various types of information including, but not limited to: webcam audio and/or video; desktop streaming; device interface events; system information; Internet connectivity; system state; user information; appointment information; session events; session state; and voice and/or chat communications.

Figure 23:
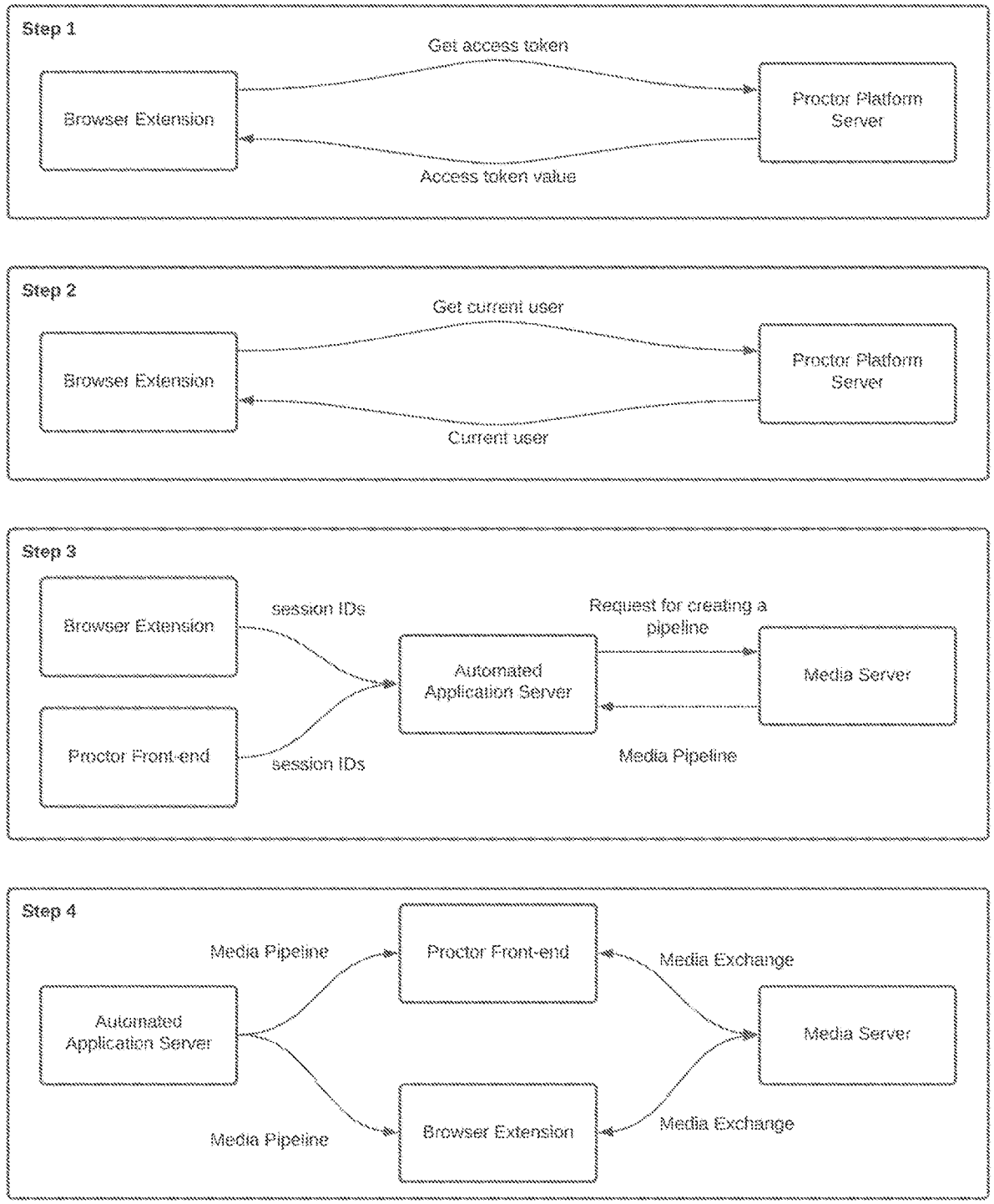
FIG. 23 illustrates a user flow and interaction model according to certain embodiments.

FIG. 23 illustrates a user flow and interaction model according to certain embodiments. Step 1 includes a user interacting with the end-user software to login to the system. At Step 2, the scheduling system may interact with the end-user software to determine the user's role. Further, Step 3 shows that after the login, user roles have been determined, and if a student would connect to the media server and could be observed in real-time by a remote proctor. Further, Step 4 shows that a proctor could interact with the media server through the scheduling system to interact with the student or test-taker in real-time.

Figure 24:
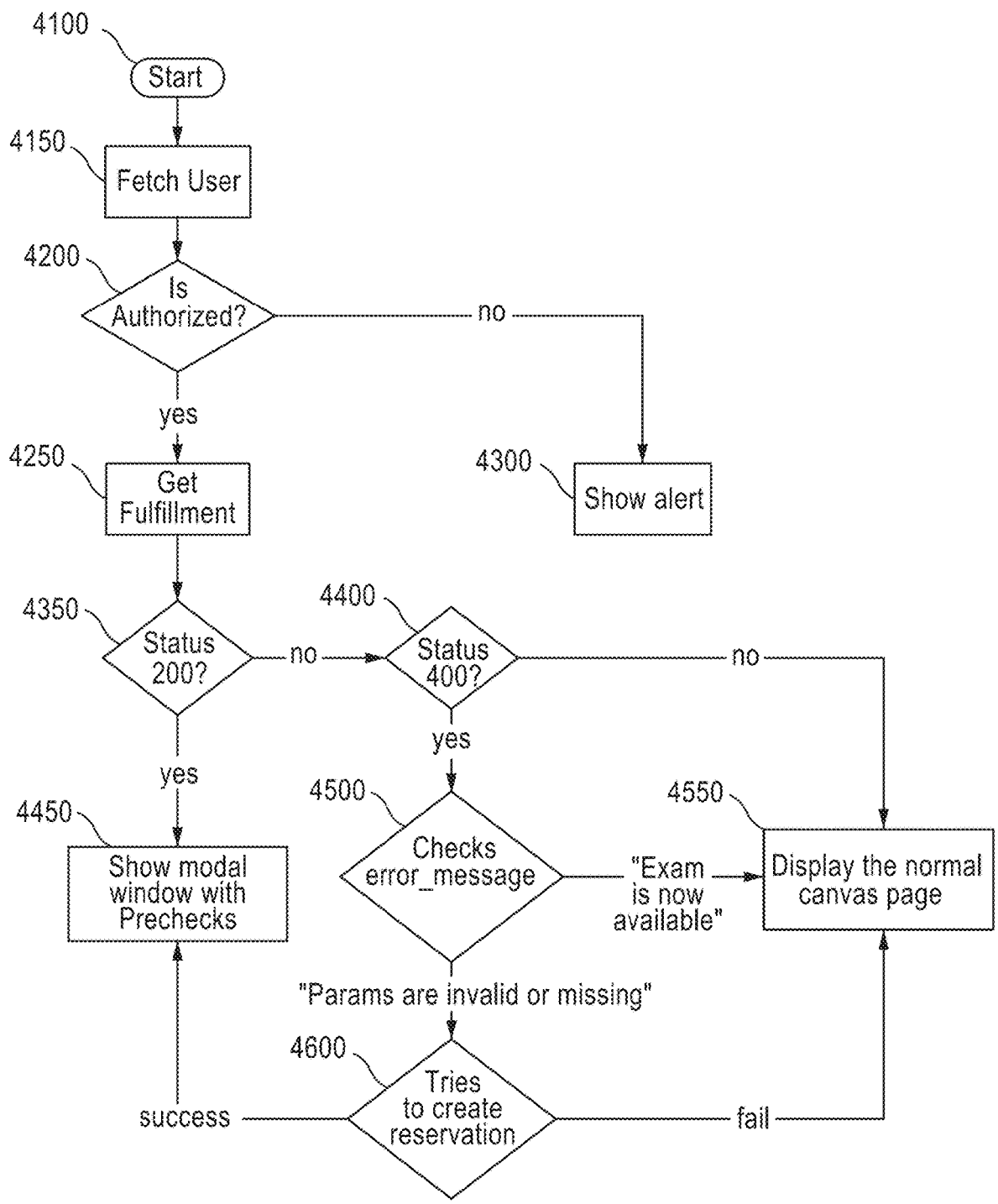
FIG. 24 illustrates a partial test-taker user flow according to certain embodiments.

FIG. 24 illustrates partial test-taker user flow according to certain embodiments. In particular, FIG. 24 illustrates a user flow for a test-taker who may or may not have an appointment. The test-taker may log into the system, which may be the scheduling platform that has not been enhanced with automated proctoring, and log into their test delivery platform. The end-user component may establish, with the scheduling component that a fulfillment or session exists or does not exist. If one exists, the user may proceed to the system pre-checks. In certain embodiments, the system pre-checks may include, but not limited to, at least the following: checking the users' environment (e.g., lighting, sounds, and/or movement); validating that their computer has a functioning camera, microphone, available bandwidth, and open network communication; and validating their identities. If one does not proceed and there are no errors, then a session may be created, and the user may then proceed to the system-pre-checks.

As illustrated in FIG. 24, at 4100, the student may start the process for initiating a session. At 4150, the system may attempt to figure out who the user is. In addition, at 4200, the system may either sign the user, ask the user to sign-in, or require the user to sign-up. At 4250, if the user is authorized at 4200, the system may check for an existing reservation/fulfillment, or create a new one. Further, at 4300, if the user is not authorized at 4200, the system may alert the user to sign-in or sign up. At 4350, the system may check for a positive response to proceed to start the exam. At 4400, if the system received a negative response at 4350, the system may either direct the user to validate the error, or direct the user back to the exam page.

As further illustrated in FIG. 24, at 4450, the system may start the exam check-in process. In addition, at 4500, the system may determine the type of error message and either try to create a reservation/fulfillment again, or direct the user back to the exam page. Further, at 4550, it is shown that the user is/was redirected back to the exam start page. Finally, at 4600, the system may try to create reservation/fulfillment. Further, at 4600, success may start the exam check-in process and failure may lead the student back to the exam start state.

Figure 25:
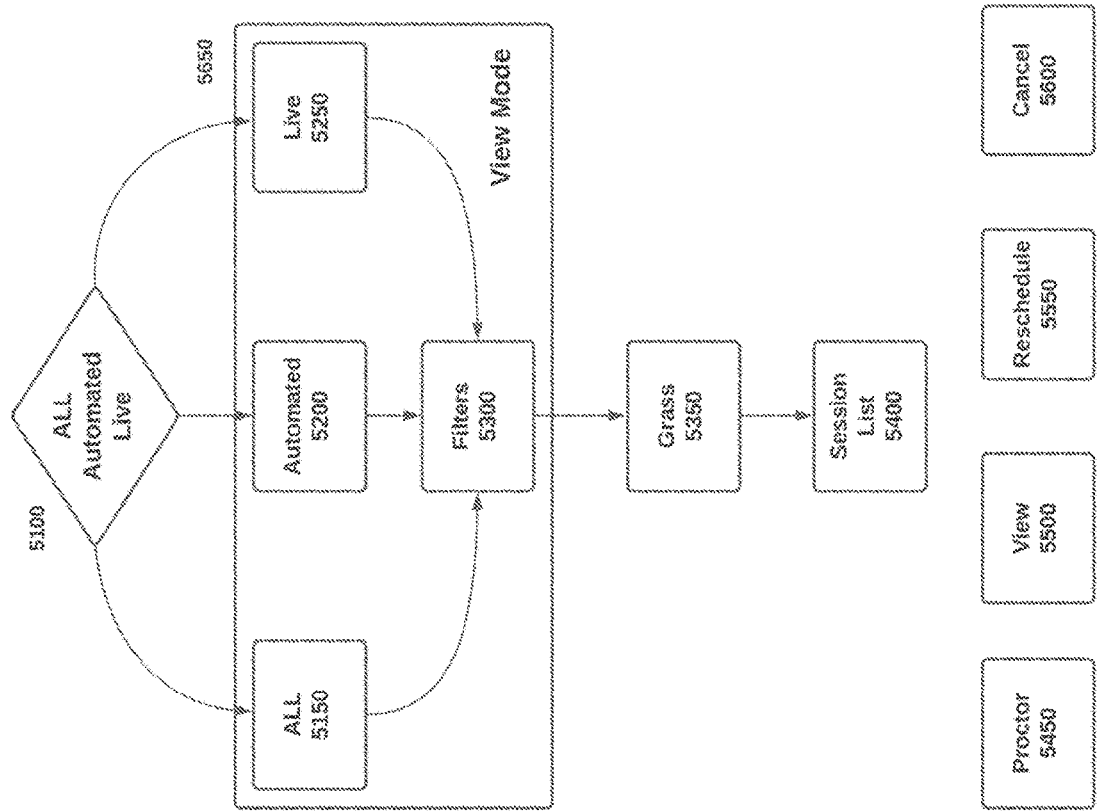
FIG. 25 illustrates a proctor user flow according to certain embodiments.

FIG. 25 illustrates a proctor user flow according to certain embodiments. For instance, FIG. 25 illustrates an overview of a proctor flow. According to certain embodiments, the user may be able to select their view mode 5100 and 5650. The view mode may include an ALL mode 5150, which shows all sessions in a given time window. The view mode may also include an automated mode 5200, which only shows automated sessions in a given time window. Further, the view mode may include a Live mode 5250, which only shows Live sessions in a given time window. In addition, certain embodiments may include a Dashboard that shows various statistics such as the current reservations per hour 5350, and have the ability to search for any session from this page.

According to certain embodiments, the session list 5400 illustrated in FIG. 25 may show four different functions. The first function may be the proctor 5450. Clicking this may bring up the test-takers media stream. In this view, the proctor may have access to a predefined set of exam instructions that enable the proctor to perform their function, desktop view, timeline events, authentication results, and any information necessary proctor or review the session. The proctor may also have the ability to communicate with the test-taker in the event it is a live session.

The second function may be a view function 5500. If the session is complete, this may be similar to the proctor function. Further, the third function may be a reschedule function 5550. If this is a live session, the user may have the ability to reschedule the session. Finally, the fourth function may be a cancel function 5600. If this is a live session, the user may have the ability to cancel the session. In certain embodiments, the manager may have the ability to assign sessions for proctoring or review. In other embodiments, proctors may only see sessions that they should be responsible for or assigned. The interface may indicate if a session needs attention.

Figure 26:
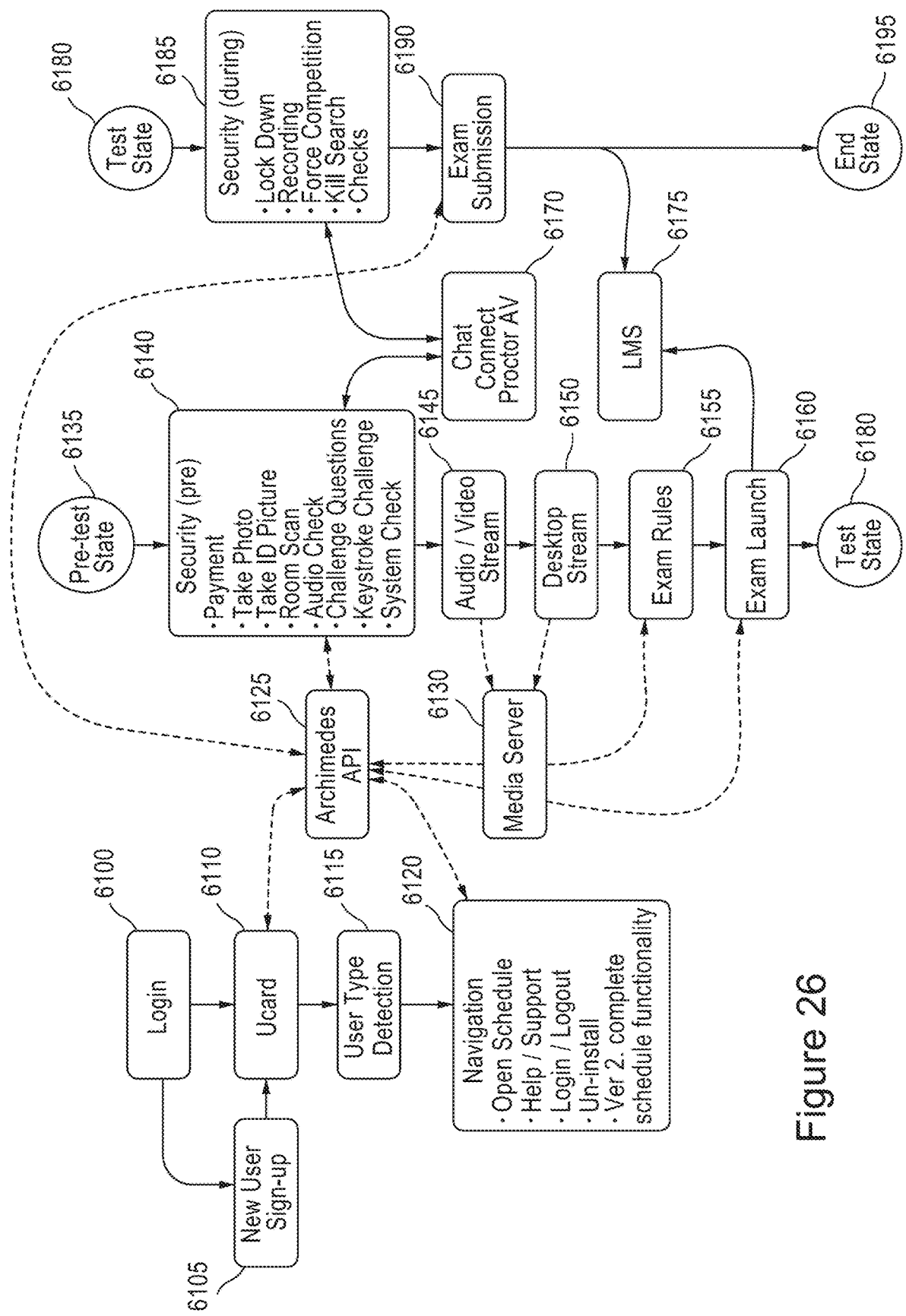
FIG. 26 illustrates a test-taker user flow according to certain embodiments.
Figure 27:
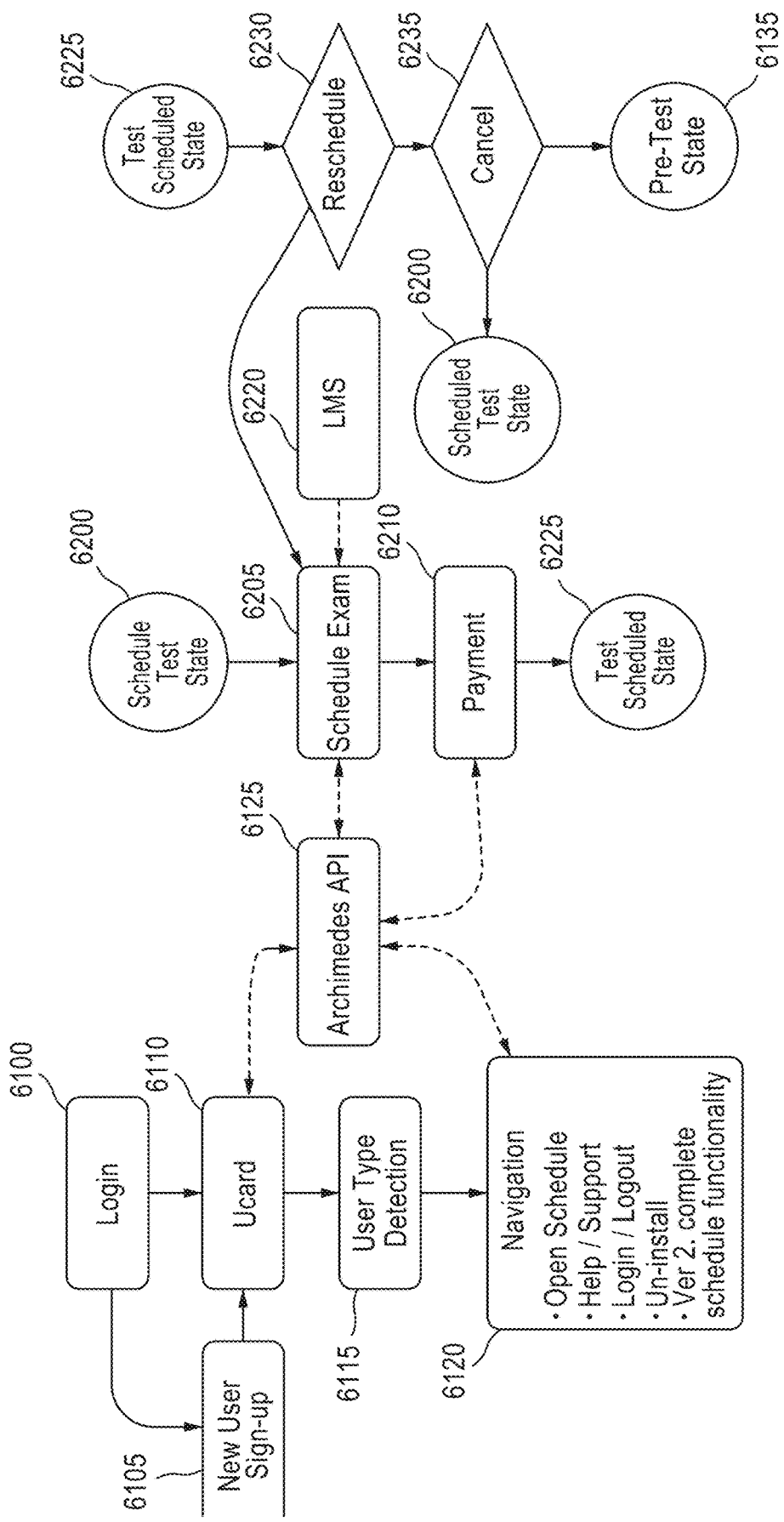
FIG. 27 illustrates a continuation of the test-taker user flow of FIG. 26 according to certain embodiments.

FIGS. 26 and 27 illustrate a test-taker user flow according to certain embodiments. The test-taker user experience may be composed of the following states: schedule test; scheduled test; pre-test; test; and test end. In the scheduled test state 6200, the test-taker may navigate to their test location in the LMS 6220, and have the ability to schedule their exam 6205 or take it on-demand, if applicable. When scheduling the exam, the test-taker may select the appropriate date/time and then pay for the session 6210 if applicable. If no scheduling or payment is involved, then the test-taker may be taken to the pre-test state 6135. If scheduling and/or payment were involved, the test-taker may be in the scheduled state 6225.

According to certain embodiments, in the scheduled state 6225, the test-taker may have the ability to reschedule 6230 or cancel 6235 their appointment. If the test-taker decides to reschedule or cancel, the test-taker may go back to the schedule test state 6200. In this state, the test-taker may see a countdown timer with the time until the appointment along with a link to test their equipment. Further, in the pre-test state 6135, certain embodiments may engage security features 6140 in the end-user software based on institution-defined settings, being audio/video/desktop recording/streaming 6145, 6150 and prompt exam rules 6155. As illustrated in FIG. 26, the audio/video stream 6145 and desktop stream 6150 may be in communication with the media server 6130, and the media server 6130 may be in communication with the Archimedes API 6125. In certain embodiments, the Archimedes API 6125 may be an application programming interface for the scheduling system that allows for external communications between applications or servers.

According to certain embodiments, the security features 6140 may include, but are not limited to the following: additional payments; taking the test-taker's photo; taking a photo of the test-taker's ID and checking it's authenticity; recording a room pan; taking a biometric sample (e.g., audio, keystroke, etc.); system process checks; require one screen or full screen; disable additional tabs, printing, clipboard, and right-click; challenge questions; audio floor analysis; and facial check and/or tracking.

Once the test-taker has completed the automated launch process, a button may be available to start the exam 6160. After exam launch at 6160, the test-taker may be directed to the Learning Management System (LMS) 6175 (i.e., Instructure Canvas, Blackboard, Moodle). The purpose of the LMS 6175, according to certain embodiments, may be to house, organize, communicate, and deliver learning and assessment materials for the student. According to certain embodiments, the end-user software may release the exam password, and the user may be in the test state 6180. At anytime during the pre-test state 6135, the test-taker may connect to a proctor via a chat 6170, get assistance, or ask questions. In certain embodiments, in the test state 6180, the end-user software may have unlocked the exam 6185, and will continue to stream audio, video, and/or desktop media, and usage data to the media server 6130 and scheduling system server for real-time analysis. In addition, at 6185 under the test state, the test-taker may be continually monitored. According to certain embodiments, 6185 may represent the collection of the input by the proctoring software that is downloaded on the test-taker's machine. The information may be sent to the server, which may then be provided to the media server 6130 and Archimedes API 6125, and then may further be processed by a processing server. The information may then be used by the Archimedes API 6125 and/or the processing server to determine if the test-taker is engaging in questionable behavior such as cheating. Some of the collected input may include, but not limited to the following: interval checks of processes, tabs, window focus, and resize; mouse clicks and keystrokes; time calculations; lighting levels; audio levels; and movement tracking.

According to certain embodiments, in the event of a blatant tampering with the end-user software is detected, the exam may be forced to submit an incident report. In certain embodiments, the Archimedes API 6125, media server, and/or the processing server may determine if there has been a blatant tampering with the end-user software and submit an incident report, and such determination may be made automatically. According to other embodiments, a proctor of administrator can also make this determination and submit an incident report manually. If there are no incidents, the exam may be submitted, and the end-user software may be placed in the end state 6195. According to certain embodiments, in the end state 6195, the exam has been completed (natural or forced), the end-user software may cease all audio, video, desktop, and/or data streaming, and return to the schedule state 6225.

Before entering the above-described test states, a test-taker may first be prompted to download and install the end-user software prior to taking an exam. Once the end-user software has been downloaded, the test-taker may login 6100 with a direct scheduling system account or through a single sign-on option from the test-taker's Test Delivery Platform or LMS.

As illustrated in FIGS. 26 and 27, the test-taker may login with a user account or Ucard. If the test-taker did not have an account, they may be prompted to create an automated identity check and sign-up as a new user 6105 and create an identification card such as a Ucard 6110. During the procedure of creating an automated Ucard, the test-taker's equipment may be checked. Further, recording may be started, and the test-taker may be prompted to complete an account profile. The test-taker may also be prompted to show his/her ID, and optionally answer challenge questions and complete a keystroke security check. Upon completion of creating the Ucard, the test-taker may automatically be assigned a "student" user level, and at this point may be ready to schedule or take exams.

At 6115, the test-taker may be detected to determine a user type 6115. After the user type is detected, the test-taker may be presented with various navigation options 6120. For example, the navigation options 6120 may include: view/open schedule that includes single sign-on into the scheduling system to see scheduled exams, and run reports; help/support to provide access to the FAQ and Live Chat Services; un-install to remove the software; and disable to disable the software.

After the automated identity check, the test-taker may automatically be enrolled as a "test-taker" user and would be ready to schedule or take available exams. According to certain embodiments, after a successful login, the test-taker may have the ability to view and/or open schedule and exam, get help/support (provide access to frequently asked questions and chat services), and uninstall the software and/or remove the software.

Figure 28:
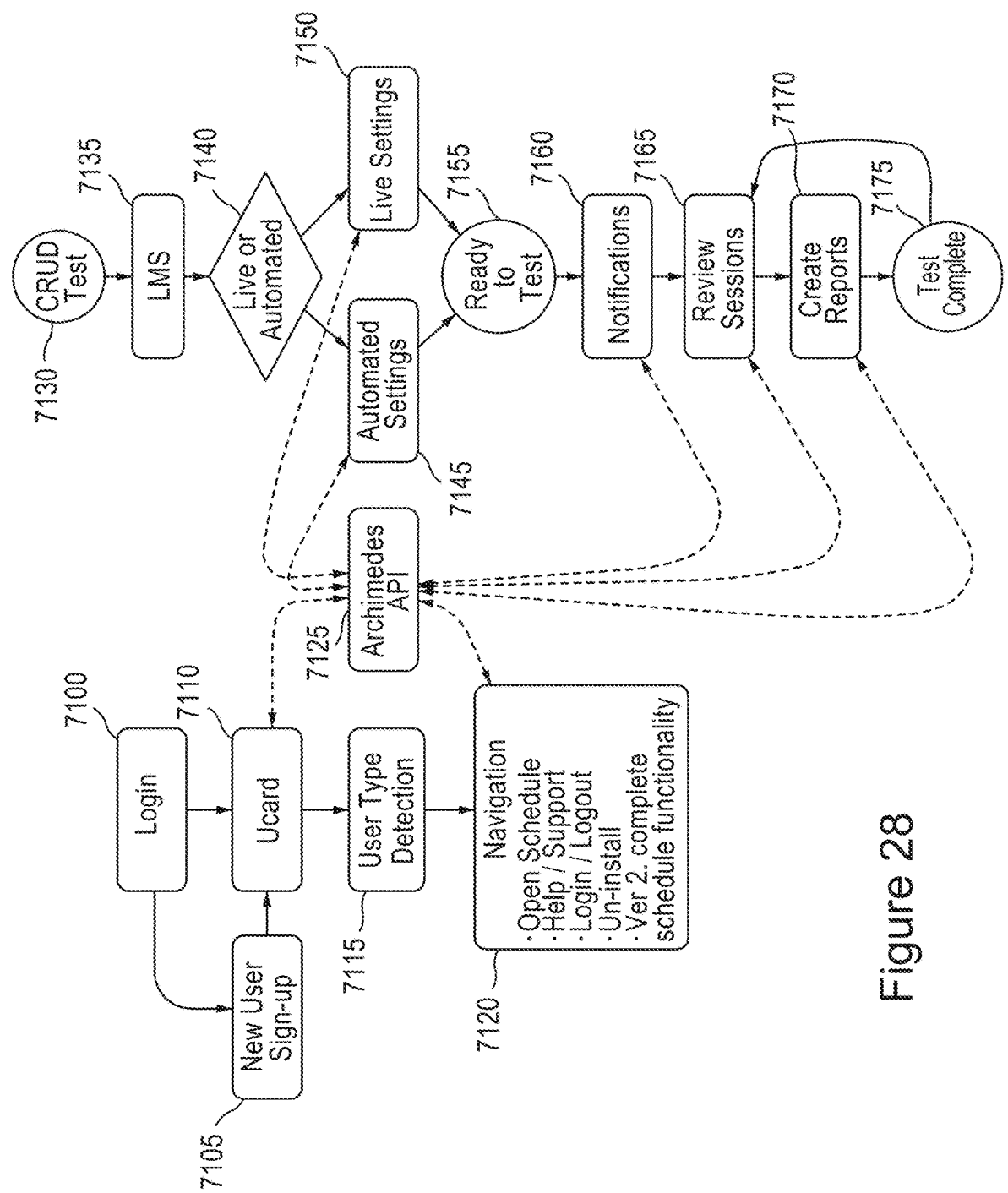
FIG. 28 illustrates an instructor or exam administrator user workflow according to certain embodiments.

FIG. 28 illustrates an instructor or exam administrator user workflow according to certain embodiments. Here, the user may interact with their LMS, test-delivery platform, help/support through the end-user software. The end-user software may interact with the scheduling system, media servers, and the LMS and/or test delivery platform. The instructor or exam administrator user experience may be composed of the following: installation; login; navigation; create/read/update/delete (CRUD) test; ready to test; and test complete.

According to certain embodiments, the user may be invited to download the end-user software via email notification or by some other means. The user may also navigate to a website to download the software. Once the end-user software has been installed, the user may login 7100 through a schedule system account or via a single sign-on from their LMS or test delivery system. Following the login, the user may proceed through steps 7105, 7110, 7115, and 7120, which are similar to those of 6105, 6110, 6115, and 6120 described with respect to FIGS. 26 and 27. If the user did not have an account, they would be prompted to create an automated identity verification, and create an automated ID card, such as a Ucard. During the procedure of creating an automated Ucard, the instructor's equipment may be checked. Further, recording may be started, and the instructor may be prompted to complete an account profile. The instructor may also be prompted to show his/her ID, and optionally answer challenge questions and complete a keystroke security check The instructor may then be automatically assigned an "institution" user level if using the Learning Tools Interoperability (LTI) user-role matching. In the event the user is not using LTI user-role matching during the account creation process, they will designate if they are a test-taker or an institutional user. According to certain embodiments, the LTI may be a data communication specification. This specification may be used by LMS creators and organize their user groups into specific roles, such as administrator, faculty, instructor, learner, etc. This feature, according to certain embodiments, may allow for the ability to comply with the standard and accept that user role in the scheduling system.

Upon a successful login, the user may have the following navigation 7120 options from the end-user software: view/open schedule that includes single sign-on into the scheduling system to see scheduled exams, and run reports; help/support to provide access to the FAQ and Live Chat Services; un-install to remove the software; and disable to disable the software.

During implementation of the CRUD test 7130, the test taker may have the ability to create/read/update/delete their test from their LMS interface 7135. Further, the user may have the ability to designate if the test will be live proctored or automated 7140. Depending on which settings they select, they may be provided with the appropriate form fields to setup their test such as, for example, an automated settings 7145 form field or a live settings 7150 form field. At this point, the test-takers may take or schedule their test; the settings could be viewed, updated, or removed.

At the ready to test state 7155, the test may be ready to be taken. Depending on what settings were selected, the user may receive the following notifications 7160 via an indicator, a short message service (SMS), or email: scheduled; rescheduled; cancelled; testing now; test submitted; or incident report. Once a test-taker has submitted a test, the instructor/institution may review 7165 the session recordings. The sessions may contain proctor notes and/or automated flags. Further, the user may view a session in progress. If there is a session of particular interest, the user may create a report 7170 from it or export some information. Once all the test-takers have submitted their exams, the institutional user may continue to review sessions or create reports for as long as the institution's data retention settings allow 7175.

Figure 29:
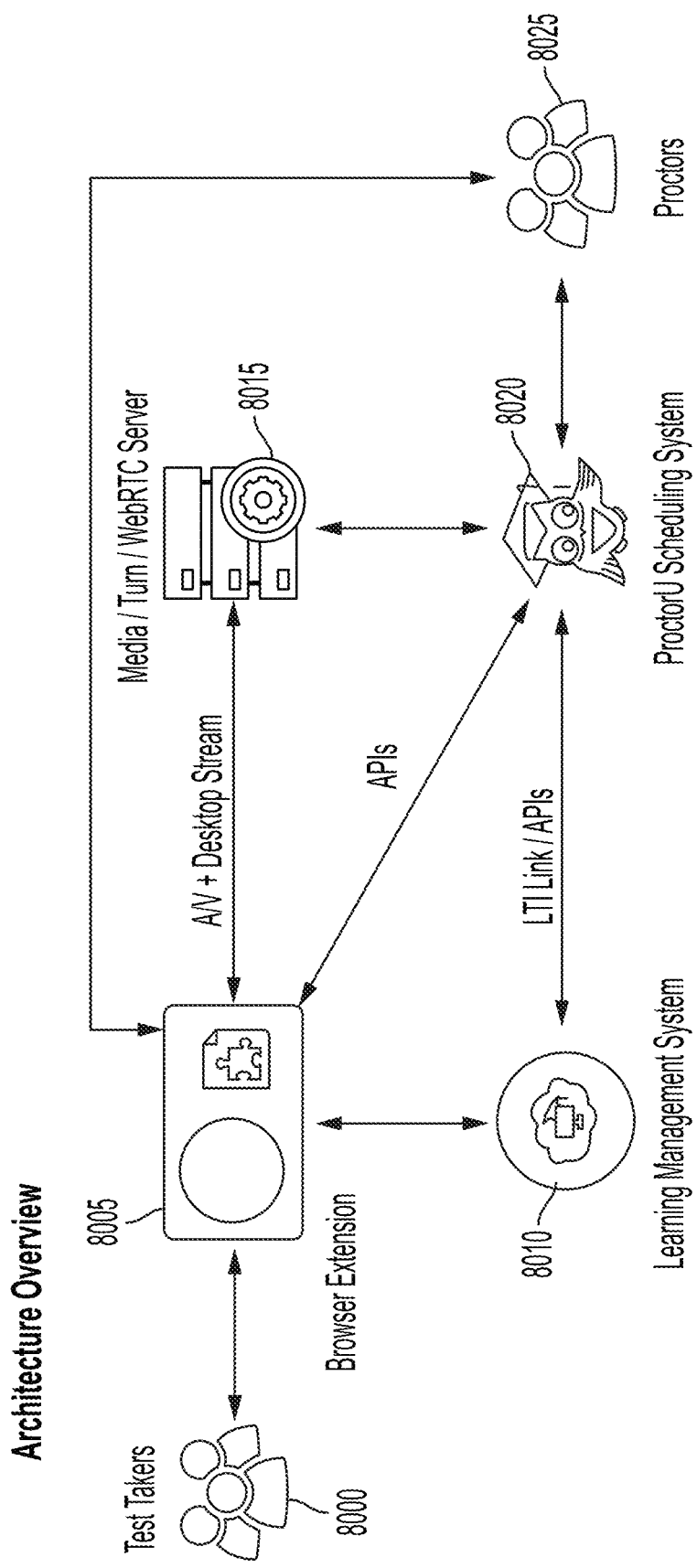
FIG. 29 illustrates an architecture overview according to certain embodiments.
Figure 30:
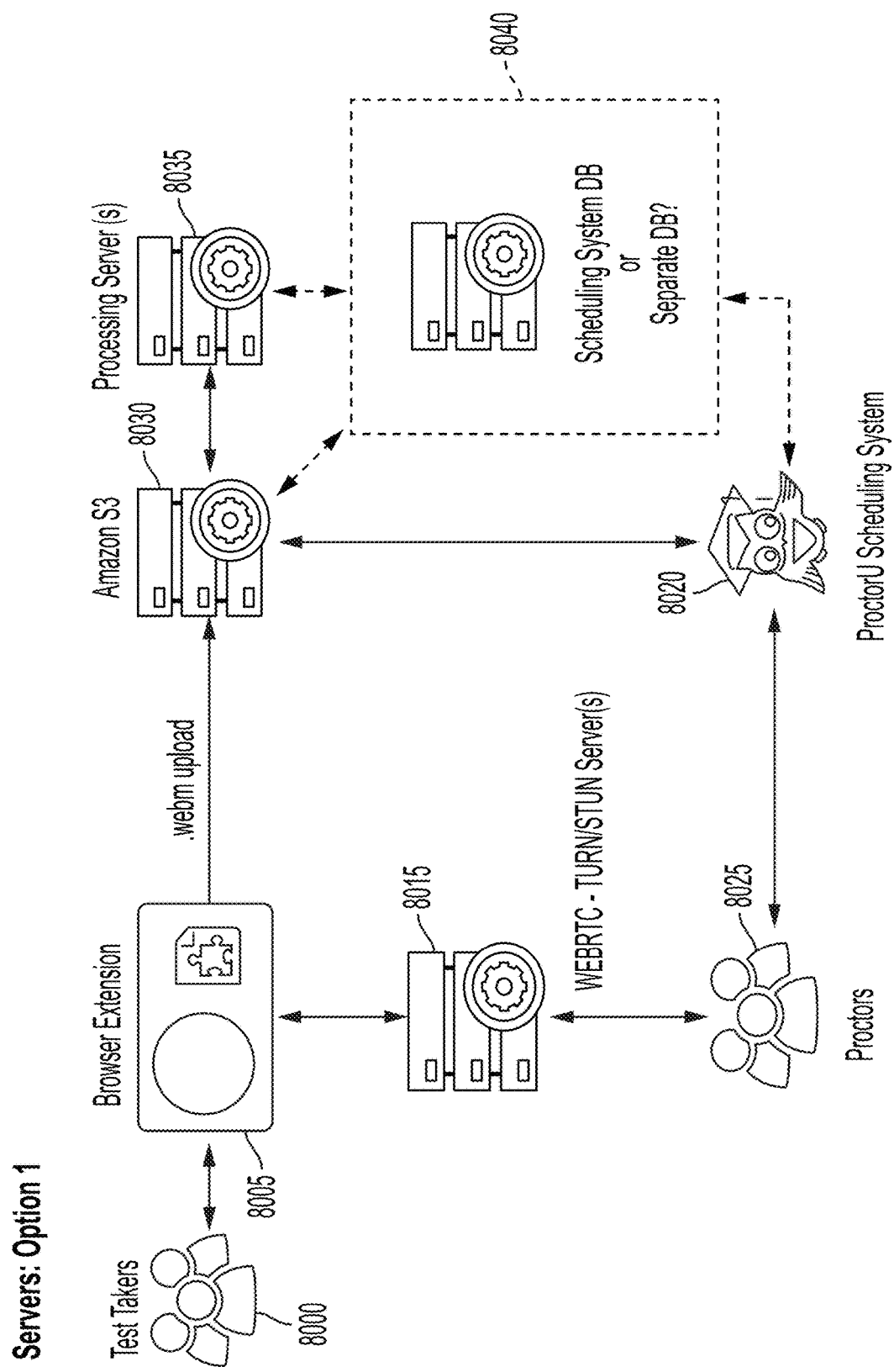
FIG. 30 illustrates a first server infrastructure architecture according to certain embodiments.
Figure 31:
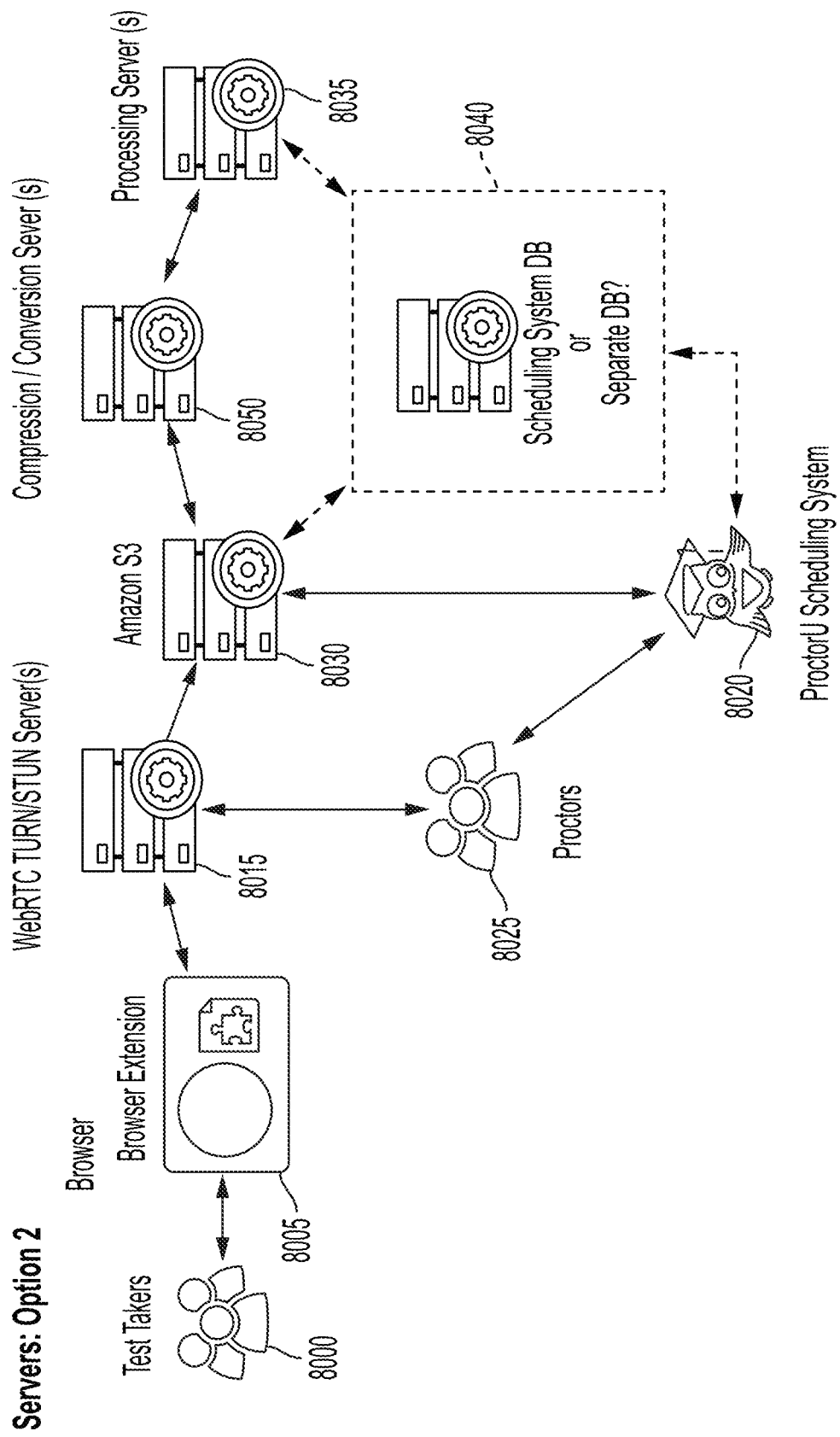
FIG. 31 illustrates a second server infrastructure architecture according to certain embodiments.
Figure 32:
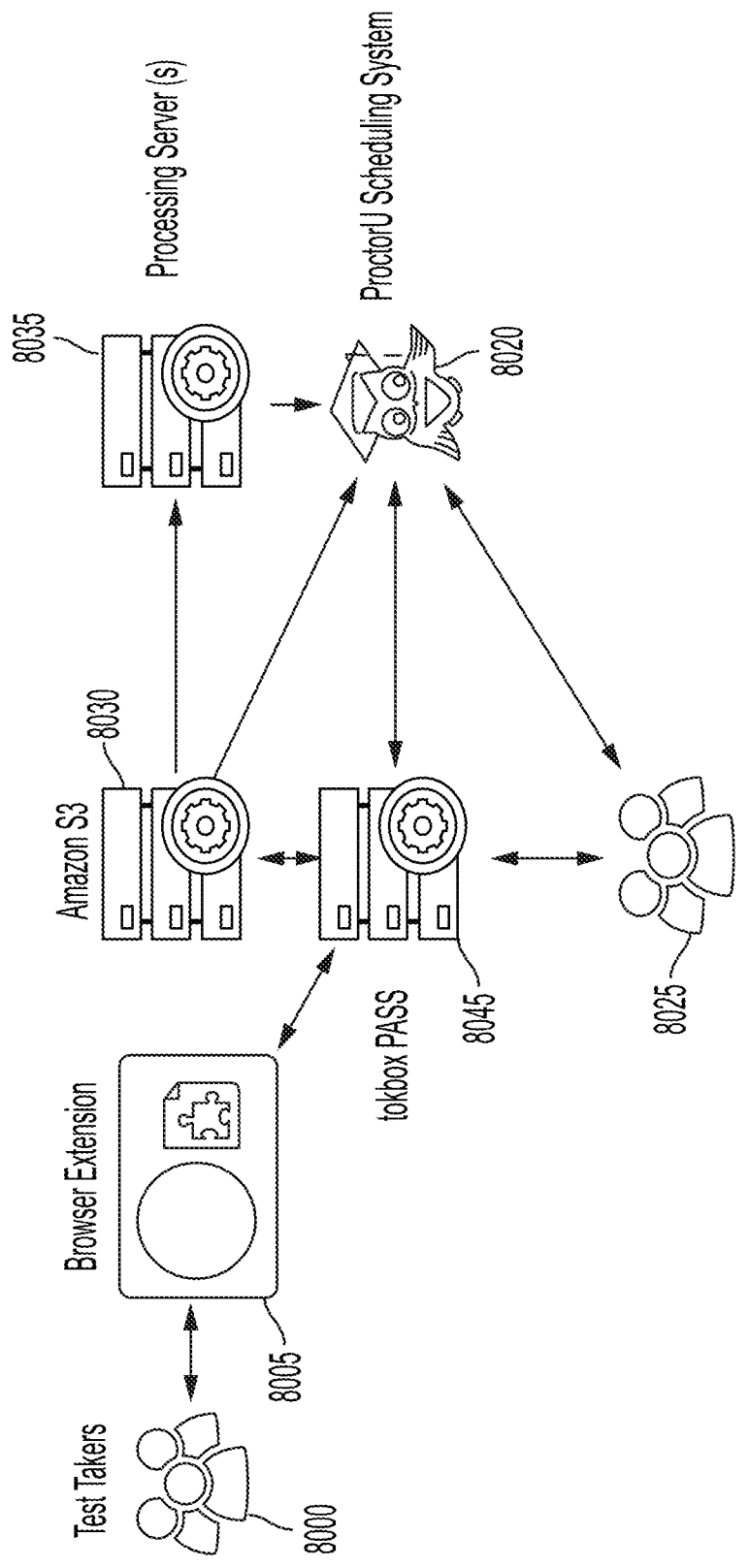
FIG. 32 illustrates a third server infrastructure architecture according to certain embodiments.

FIGS. 29-32 illustrate infrastructure architectures according to certain embodiments. In particular, FIG. 29 illustrates an overview of certain embodiments of the invention with the added description of the LMS to show how certain embodiments of the invention would interact with it. Further, FIG. 30 illustrates a way that FIG. 29 could be implementing using native .webm AV streaming, according to certain embodiments. In addition, FIG. 31 illustrates a second way that FIG. 29 may be implemented using different formats of AV streaming, according to certain embodiments. Further, FIG. 32 illustrates a third way that FIG. 29 may be implemented using a third party PAAS tool for AV streaming, according to certain embodiments. The potential infrastructure architectures may be considered to implement certain embodiments of the invention.

As illustrated in FIGS. 29-32, the test takers 8000 may represent the students or users of embodiments of the invention. Further, the browser extension 8005 may be an embodiment of the client facing part of certain embodiments of the invention. In addition, the Learning Management System (LMS) 8010, as noted above, may be an instructure canvas, blackboard, and/or Moodle. Further, the media/turn/stun WebRTC server(s) 8015 may be a method of signaling WebRTC communications, and the ProctorU Scheduling System 8020 may be an embodiment of the backend processing of certain embodiments of the invention. Further, the proctors 8025 may be observers of the exam sessions and users of certain embodiments of the invention.

As further illustrated in FIGS. 29-32, the Amazon S3 may represent a method of storing data according to certain embodiments. In addition, the processing server(s) 8035 may represent a method of processing audio, video, and/or behavioral information according to certain embodiments. In addition, the scheduling system DB or separate DB 8040 may represent an approach of housing the data for the automated sessions outside of the ProctorU Scheduling System 8020. Further, the takbox PAAS 8045 may represent an approach of using an existing technology service to assist with part of certain embodiments of the invention as it pertains to audio or video communication, recording, and transfer. In addition, the compression/conversion server(s) 8050 may represent an approach in the data flow to convert the audio, video, or behavioral information into an acceptable format for more efficient data processing according to certain embodiments.

Figure 33:
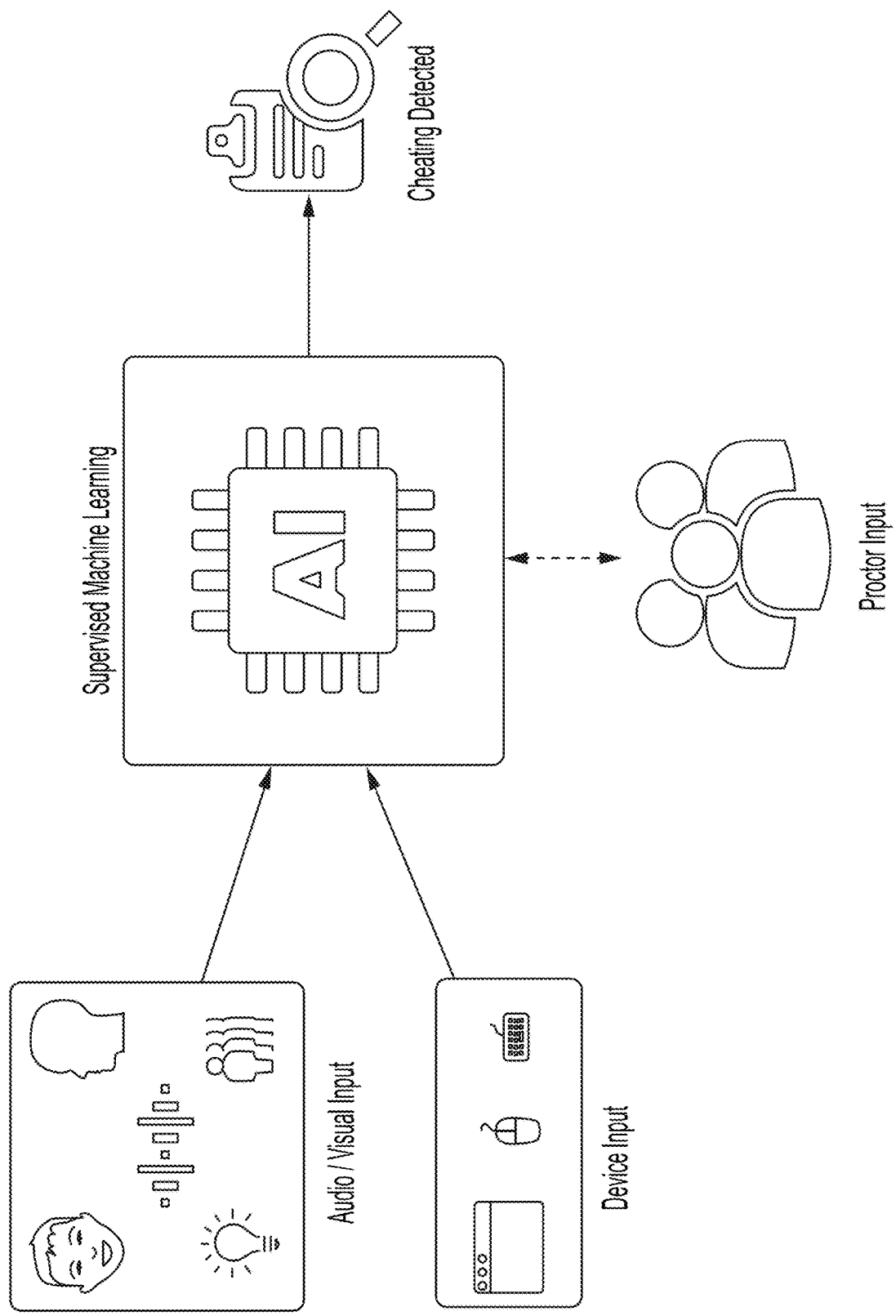
FIG. 33 illustrates a supervised machine learning flow according to certain embodiments.

FIG. 33 illustrates a supervised machine learning flow according to certain embodiments. The supervised machine learning may be implemented on the media server or the processing server, and may be controlled by certain embodiments of the invention. In particular, FIG. 33 illustrates how audio/visual/device input patterns may be stored and analyzed using supervised machine learning. With the assistance of proctor input from observing sessions, certain embodiments may establish the difference between normal and aberrant testing behaviors. For instance, according to certain embodiments, patterns of cheating may be captured, received, and/or obtained by the system implementing the supervised machine learning. The patterns, in certain embodiments, may be monitored constantly, along with additional ID validations of the test-taker, for signs of cheating via the machine learning. Alternatively, in other embodiments, such input of information regarding the patterns of cheating may be provided directly as input to the system implementing the supervised machine learning. Such patterns may be based on various factors of the test taker, including, for example, external resources. In certain embodiments, the external resources may include, for example, the test taker leaving the view of the camera for a certain amount of time such as for about 15 seconds. Other lengths of time of the test taker's lost face may also be monitored. The lost face may be followed by an answer submission when the exam is no resources allowed. Further, the system may look for cheating behavior of the test-taker to occur at least 3 times. However, in other embodiments, the number of times that cheating behavior is detected can be adjusted to a desired amount.

According to certain embodiments, each time a proctoring session occurs, the session patterns may be compared to the initial patterns. The initial patterns may be pre-programmed behavioral patterns that are designated to be representative of cheating patterns. In certain embodiments, when cheating occurs during an exam session, the actual behavior patterns of the test-taker may be compared to the original pre-programmed patterns. Thus, certain embodiments may also make a determination if the observed patterns match those of the pre-programmed patterns. If the patterns match, then the system may mark the session for cheating. In addition, according to certain embodiments, it may be possible for the comparisons to shape the initial pre programmed patterns into something more accurate via machine learning. That is, according to certain embodiments, recognition of distinctive patterns may be continually refined and updated. Further, in other embodiments, a human proctor may then review the session and either support the assertion of cheating or deny it. In either case, the human assertion may strengthen the overall behavior of certain embodiments of the invention.

Figure 34:
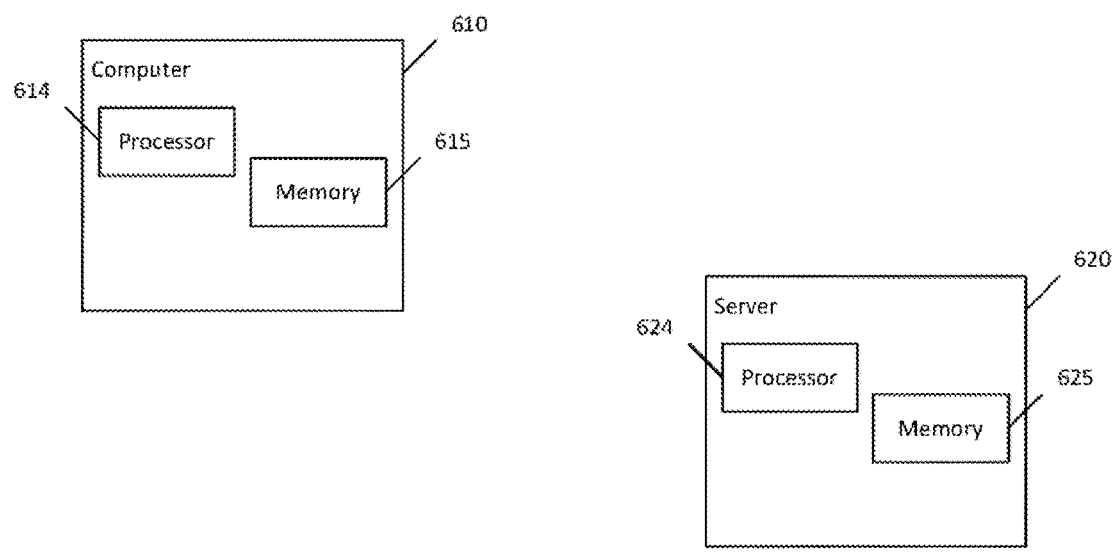
FIG. 34 illustrates an exemplary system according to certain embodiments.

FIG. 34 illustrates an example of a system according to certain embodiments. It should be understood that each block of FIGS. 1-33 and 35, or any combination thereof, may be implemented by various means or their combinations, such as hardware, software, firmware, one or more processors and/or circuitry. In one embodiment, a system may include multiple devices, such as, for example, a computer 610 and a server 620. The system may include one or more computers 610 and more than one server 620, although only one computer 610 and one server 620 are shown for the purposes of illustration.

The computer 610 may be any computing device or a user computer associated with students 14 or proctors 34 that can take the form of a traditional server/desktop/laptop; mobile device such as a smartphone or tablet; etc. Computing devices may typically include one or more processors coupled to data storage for computer program modules and data. Key technologies may include, but not limited to, the multi-industry standards of Microsoft and Linux/Unix based Operation Systems; databases such as SQL Server, Oracle, NOSQL, and DB2; Business analytic/Intelligence tools such as SPSS, Cognos, SAS, etc.; development tools such as Java, NET framework (VB.NET, ASP.NET, AJAX.NET, etc.); and other e-Commerce products, computer languages, and development tools. Such program modules may generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

In certain embodiments, the server 620 may be a node, host, or server in a network. For example, the server 620 may be a remote desktop viewing/control server, an audio/video server, a client server, an administration server, a database server, or other similar type servers.

Each of these devices may include at least one processor respectively indicated as 614 and 624 for processing information and executing instructions or operation. Processors 614 and 624 may be any type of general or specific purpose processors. While a single processor 614 and 624 is shown for each device in FIG. 34, multiple processors may be utilized in each device according to other embodiments. In fact, processors 614 and 624 may include one or more general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices. The processors 614 and 624 can be implemented as a single controller, or a plurality of controllers or processors.

At least one memory (internal or external) can be provided in each device, and indicated as 615 and 625, respectively. The memory may include computer program instructions or computer code contained therein. The processors 614 and 624 and memories 615 and 625, or a subset thereof, can be configured to provide means corresponding to the various blocks and processes shown in FIGS. 1-33 and 35.

Memories 615 and 625 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer instructions can be configured, with the processor for each device, to cause a hardware apparatus such as apparatus 610 and server 620 to perform any of the processes described herein (see, for example, FIGS. 1-33 and 35). Therefore, in certain embodiments, a non-transitory computer-readable medium can be encoded with computer instructions that, when executed in hardware, perform a process such as any one of the processes described herein. Accordingly, in certain embodiments, a non-transitory computer-readable medium can be encoded with computer instructions that, when executed in hardware, perform any of the processes described herein. Alternatively, certain embodiments of the invention can be performed entirely in hardware.

Figure 35:
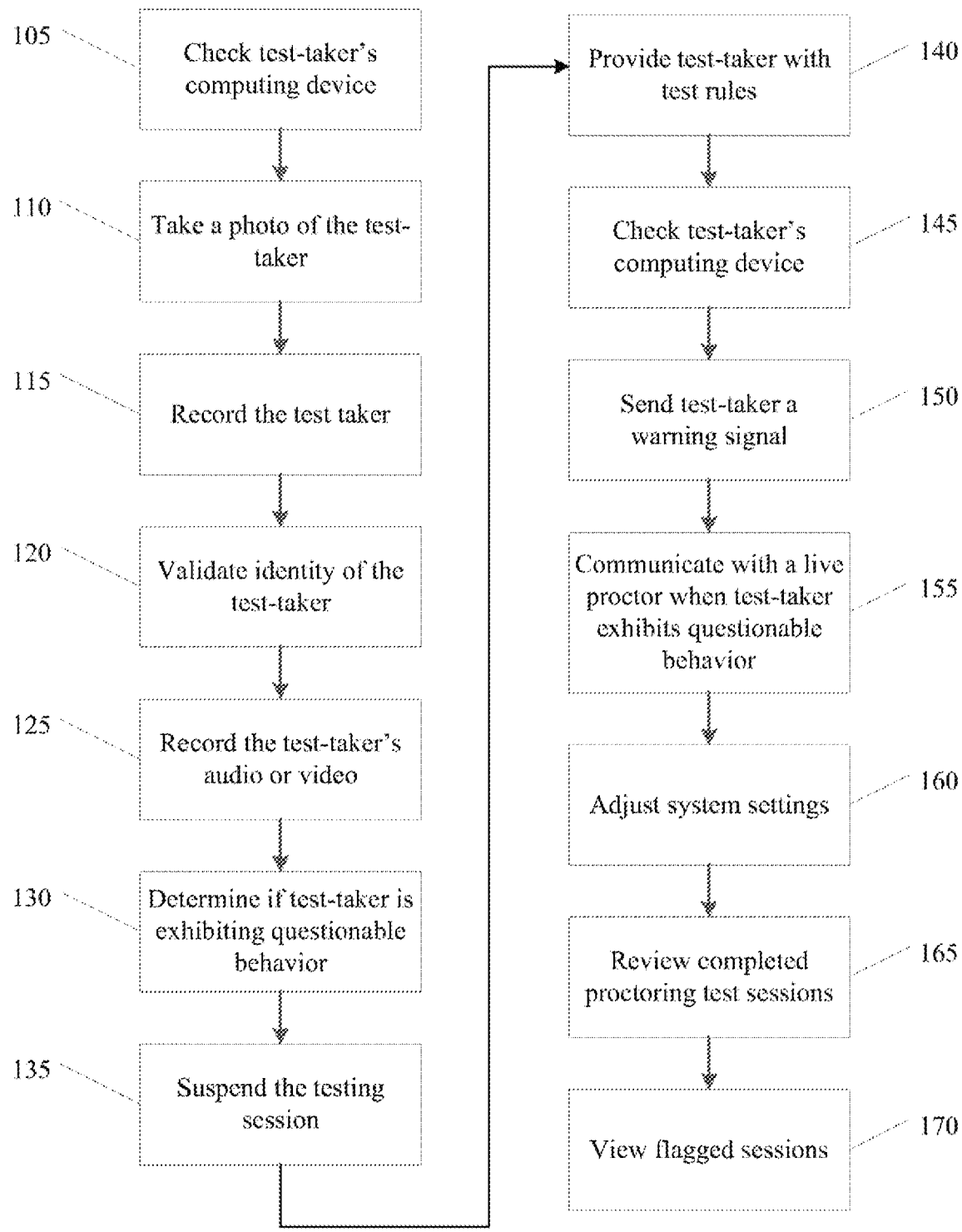
FIG. 35 illustrates a flow diagram according to certain embodiments.

FIG. 35 illustrates an exemplary flow diagram of a method according to certain embodiments. According to certain embodiments, the method illustrated in FIG. 35 may be performed by a computer, such as a computer of the embodiments described above. At 105, the method may include checking a test-taker's computing device for compatibility, and for content that provide unauthorized aid to the test-taker during a test session. The method may also include, at 110, taking a photo of the test taker. In addition, at 115, the method may include recording the test taker by performing a room pan while analyzing the surrounding of the test-taker for unauthorized objects. At 120, the method may include validating the identity of the test-taker by way of at least one of presenting challenge questions, obtaining voice biometrics, or obtaining keystroke biometrics. Further, at 125, the method may include recording the test-taker's audio or video and desktop feed.

FIG. 35 also illustrates at 130, determining if the test-taker is exhibiting questionable behavior. According to certain embodiments, the questionable behavior may be determined based on an analysis of the compatibility of the test-taker's computing device, the test-taker's photo, the room pan, validation of the test-taker's identity, and recordation of the test-taker's audio or video and desktop feed. At 135, the method may include suspending the testing session if it is determined that the test-taker is exhibiting questionable behavior.

At 140, the method may include providing the test-taker with test rules defined by an institution of the test taker. Further, at 145, the method may include checking the test-taker's computing device for applications, code, or materials used to provide unauthorized aid during the testing session. At 150, the method may include sending the test-taker a warning signal when it is determined that the test-taker is exhibiting questionable behavior. In addition, at 155, the method may include communicating with a live proctor when it is determined that the test-taker is exhibiting questionable behavior. Further, the method may include at 160, adjusting system settings for proctored test sessions, at 165, reviewing completed proctoring test sessions, and at 170, viewing sessions flagged for questionable behavior of the test-taker.

According to certain embodiments, it may be possible to provide a remote online proctoring system that is capable of describing cheating behavior by measurably consistent patterns. It is also possible to provide a system that may be configured to recognize these distinctive patterns and continue to automatically refine and update them using supervised machine learning. Such capabilities may allow for increased user experience, and enhancement in efficiency and ability to scale remote online proctoring services.

According to other embodiments, it may be possible to solve the various problems exhibited by conventional online remote proctoring discussed above. For instance, according to certain embodiments, it may be possible to perform visual ID checks, correct exam verification, perform environment checks, perform computing device checks, perform exam authorization, perform audio and/or visual observations, and perform event notations. In addition, certain embodiments may solve the issue of efficiency by only involving a human proctor in the event of a suspected issue. Using certain embodiments, a live remote proctor could be focusing on six to eight simultaneous online exam sessions that are designated as suspect by the system, while hundreds of other users are running concurrently.

As for scalability, certain embodiments may solve this problem by, as one example, relying on measured observations that less than about 17% of test-takers will attempt to cheat on an exam. Given, for example, 4 million exams, if 17% were to cheat, that would bring the necessary amount of sessions to observe down to 680,000 that would have been flagged by certain embodiments of the invention or a proctor. In addition, using certain embodiments, an organization would only require 109 proctors if the proctors performed full reviews on the sessions that lasted an average of 2 hours. If the same proctors only reviewed the recorded evidence of cheating on the session, 8 proctors would be required to successfully proctor 4 million exams.

According to certain embodiments, it may also be possible to address the problem of wait time in online proctoring. This may be addressed, for example, by automating the entire exam launching and authorization sequence according to certain embodiments described herein. In addition, certain embodiments may also resolve issues concerning bandwidth availability and stability in online proctoring. For instance, according to certain embodiments, it may be possible to use high, but minimal loss compression algorithms, along with local storage buffering in order to upload content and events when the bandwidth and connectivity become better.

According to further embodiments, it may be possible to consider and improve upon user experience, cheater adaptability, and hybrid scalability. For instance, with regard to user experience, certain embodiments may work with a large majority of users without the need for different hardware, complex software installations, and drastic modifications of testing behavior or environment. With regard to cheater adaptability, it may be possible for certain embodiments to, through the use of machine learning, continue to become more accurate overtime. Further, with regard to hybrid scalability, while certain embodiments may operate alone, other embodiments may be designed to work with human counterparts to augment their ability to perform the proctoring function.

In certain embodiments, it may further be possible to provide improvements in the system's ability for facial recognition matching, lighting checks, and sound level checks. Further, supervised machine learning may also improve upon pattern detection. According to other embodiments, it may be possible to integrate video technology with scheduling systems, provide support for continuous identity verification, and provide realtime behavior notifications with respect to normal and/or questionable behavior of test-takers.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
controlling, via a processing server, a remote computer to administer an automated exam to a test-taker, the remote computer having a plurality of input devices;
receiving by the Processing server from the remote computer one or more streams of biometric information about the test-taker, a photo ID of the test-taker, a confirmation of exam rules by the test-taker, and answers to challenge questions by the test-taker collected from the input devices prior to the exam and/or during the exam;
establishing, by the processing server via implementation of supervised machine learning a threshold for normal by defining a baseline of an environment of the test-taker prior to the exam based on the one or more streams of biometric information, lighting of the environment, sound of the environment, movement of the test-taker, input from an institution, and input from an instructor, wherein establishing the threshold for normal comprises calibrating the processing server to operate within an acceptable predefined limit of the baseline;
recording, by the Processing server via the remote computer, biometric information from the one or more streams of biometric information, audio data, and video data of the test-taker during the exam;
comparing, by the processing server via implementation of supervised machine learning, the recorded biometric information, the recorded audio data, and the recorded video data to the baseline, and recognizing patterns of questionable behavior outside the threshold for normal;
determining, by the processing server by implementation of the supervised machine learning, that the test-taker is exhibiting questionable behavior based on the recognized patterns of questionable behavior outside the threshold for normal;
stopping, by the Processing server, the exam when it is determined that the test-taker is exhibiting questionable behavior;
in response to stopping the exam, flagging, by the processing server, the exam for further review by a live human proctor;
in response to the flagging, enabling the live human proctor to communicate remotely with the test-taker via a computer associated with the live human proctor and the remote computer by a chat feature or voice communication, review why the exam was stopped and either confirm or deny the determined questionable behavior, and then allow the test-taker to continue the exam or end the exam based on their review; and automatically refining and updating, by the processing server, using the supervised machine learning implemented on the processing server, the initial pre-programmed behavioral patterns based on the accuracy of the recognized pattern of questionable behavior according to the subsequent confirmation or denial by the live human proctor.

2. The method according to claim 1, wherein the recorded biometric information and the audio or video data are reviewed by the human proctor after the exam has been completed to detect changes in the biometric information, the audio data, and the video data.

3. The method of claim 1,
wherein the plurality of input devices includes a camera,
wherein the method further comprises issuing an instruction to cause the camera to obtain captured image data of the surroundings of the test-taker, and
wherein the method further comprises
  detecting unauthorized objects in the surroundings of the test taker, and
  suspending the examination if the unauthorized objects are detected in the captured image data.

4. The method according to claim 1, further comprising:
issuing an instruction to cause the camera to pan the surroundings of the test-taker.

5. The method of claim 1, further comprising:
instructing the remote computer to issue a warning that the test-taker has been detected of exhibiting questionable behavior.

\* \* \* \* \*